US010990924B2

(12) United States Patent
Wallace et al.

(10) Patent No.: US 10,990,924 B2
(45) Date of Patent: Apr. 27, 2021

(54) SYSTEM AND METHOD FOR VARIANT CONTENT MANAGEMENT

(71) Applicant: Prinova, Inc., Toronto (CA)

(72) Inventors: Matthew Wallace, Kitchener (CA); Andrew Lehman, Kitchener (CA); Jeff Janssen, Waterloo (CA)

(73) Assignee: Messagepoint Inc., Toronto (CA)

( * ) Notice: Subject to any disclaimer, the term of this patent is extended or adjusted under 35 U.S.C. 154(b) by 966 days.

(21) Appl. No.: 14/475,064

(22) Filed: Sep. 2, 2014

(65) Prior Publication Data

US 2015/0066801 A1     Mar. 5, 2015

Related U.S. Application Data

(60) Provisional application No. 61/872,373, filed on Aug. 30, 2013.

(30) Foreign Application Priority Data

Sep. 18, 2013   (CA) .................................. CA 2827378

(51) Int. Cl.
*G06Q 10/10*     (2012.01)
*G06F 16/951*    (2019.01)
(Continued)

(52) U.S. Cl.
CPC ........... *G06Q 10/10* (2013.01); *G06F 16/951* (2019.01); *G06F 40/186* (2020.01); *G06Q 30/0251* (2013.01)

(58) Field of Classification Search
None
See application file for complete search history.

(56) References Cited

U.S. PATENT DOCUMENTS 6,073,112 A     6/2000 Geerlings
6,101,486 A *   8/2000 Roberts ............... G06Q 30/02
                                                  705/14.66
(Continued)

FOREIGN PATENT DOCUMENTS

EP          2242016 A1    10/2010
WO     2001057689 A1     8/2001
(Continued)

OTHER PUBLICATIONS

Li-Hua Li, F. Lee, Y. Chou and T. Pu, "Using Ontology for Personalized Mobile Message Computation," 2010 24th IEEE International Conference on Advanced Information Networking and Applications, Perth, WA, 2010, pp. 1255-1262, doi: 10.1109/AINA. 2010.140. (Year: 2010).*

(Continued)

*Primary Examiner* — Andrew B Whitaker
(74) *Attorney, Agent, or Firm* — McMillan LLP

(57) ABSTRACT

A machine implemented method and system for managing variation and customization of content or touchpoints for customer communications management. The touchpoint has a plurality of message zones able to receive messages from variants. Variants are selected from a database by a variant selector operating on a document composition server. The variants are selected based on selector data. The messages of the selected variant are placed into the message zones of the touchpoint and rendered for distribution to customer devices. When a variant at a higher level in the hierarchy is edited by the content creator, the system automatically updates dependent variants.

23 Claims, 18 Drawing Sheets

(51) Int. Cl.
*G06Q 30/02* (2012.01)
*G06F 40/186* (2020.01)

(56) References Cited

U.S. PATENT DOCUMENTS

| | | | | |
|---|---|---|---|---|
| 6,707,472 | B1* | 3/2004 | Grauman | G06Q 10/107 |
| | | | | 379/93.24 |
| 8,903,752 | B1* | 12/2014 | Pacovsk | G06N 99/005 |
| | | | | 706/20 |
| 2002/0112035 | A1 | 8/2002 | Carey et al. | |
| 2003/0126146 | A1 | 7/2003 | Van Der Riet et al. | |
| 2004/0103017 | A1 | 5/2004 | Reed et al. | |
| 2005/0021404 | A1 | 1/2005 | Schoder et al. | |
| 2005/0021633 | A1* | 1/2005 | Venkatraman | G06Q 10/107 |
| | | | | 709/206 |
| 2005/0039119 | A1* | 2/2005 | Parks | G06F 17/211 |
| | | | | 715/209 |
| 2005/0091109 | A1 | 4/2005 | Howard et al. | |
| 2005/0193070 | A1* | 9/2005 | Brown | G06Q 10/107 |
| | | | | 709/206 |
| 2006/0173744 | A1* | 8/2006 | Kandasamy | G06Q 30/02 |
| | | | | 705/14.42 |
| 2006/0193008 | A1 | 8/2006 | Osaka et al. | |
| 2007/0050191 | A1* | 3/2007 | Weider | G06F 17/30864 |
| | | | | 704/275 |
| 2008/0046267 | A1 | 2/2008 | Romano et al. | |
| 2008/0086369 | A1* | 4/2008 | Kiat | G06Q 30/0242 |
| | | | | 705/14.41 |
| 2012/0259620 | A1* | 10/2012 | Vratskides | G06Q 30/02 |
| | | | | 704/9 |

FOREIGN PATENT DOCUMENTS

| | | |
|---|---|---|
| WO | WO 01/57689 A1 | 8/2001 |
| WO | 2009060310 A2 | 7/2008 |

OTHER PUBLICATIONS

International Search Report for WO2009060310 issued by WIPO dated Jul. 1, 2010. Whole document.
Written Opinion of International Searching Authority for WO2009060310 issued by WIPO dated May 12, 2010. Whole document.
International Preliminary Report on Patentability for WO2009060310 issued by WIPO dated May 18, 2010.
European Search Report for Application EP14185301. Whole document.
European Search Report for Application EP14185355. Whole document.

* cited by examiner

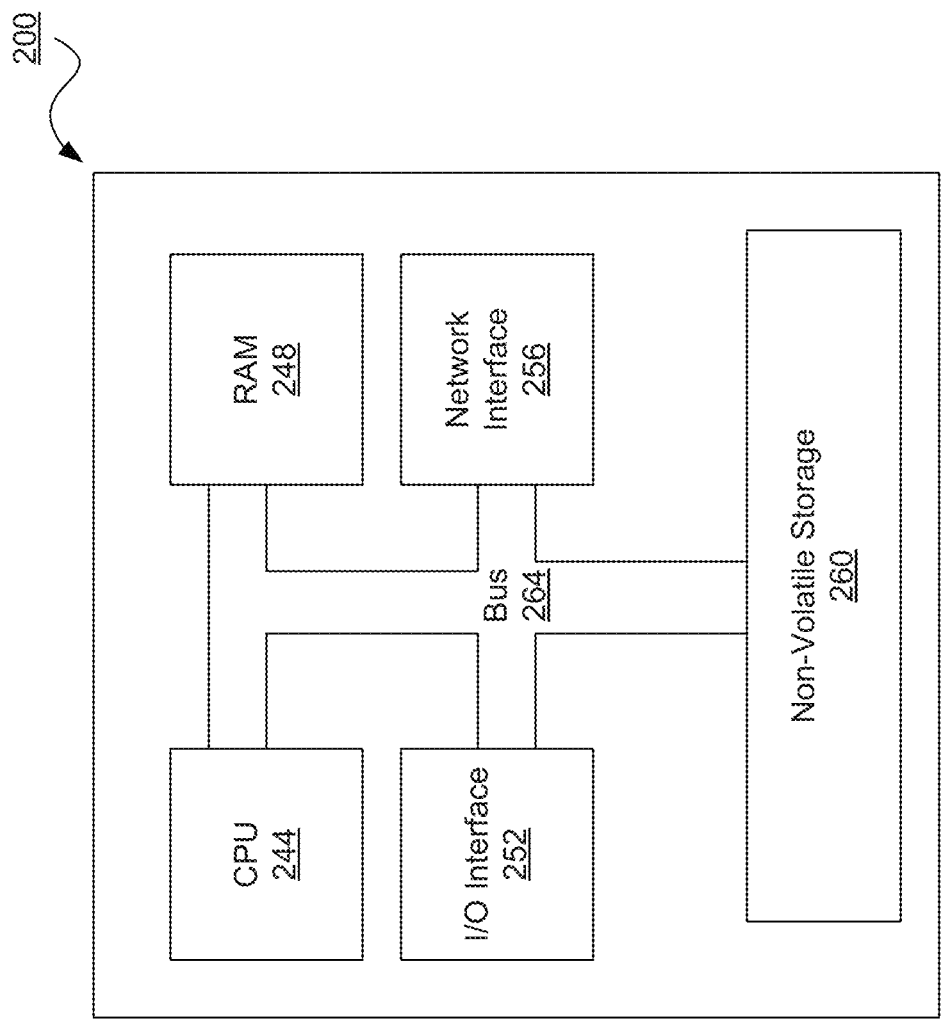

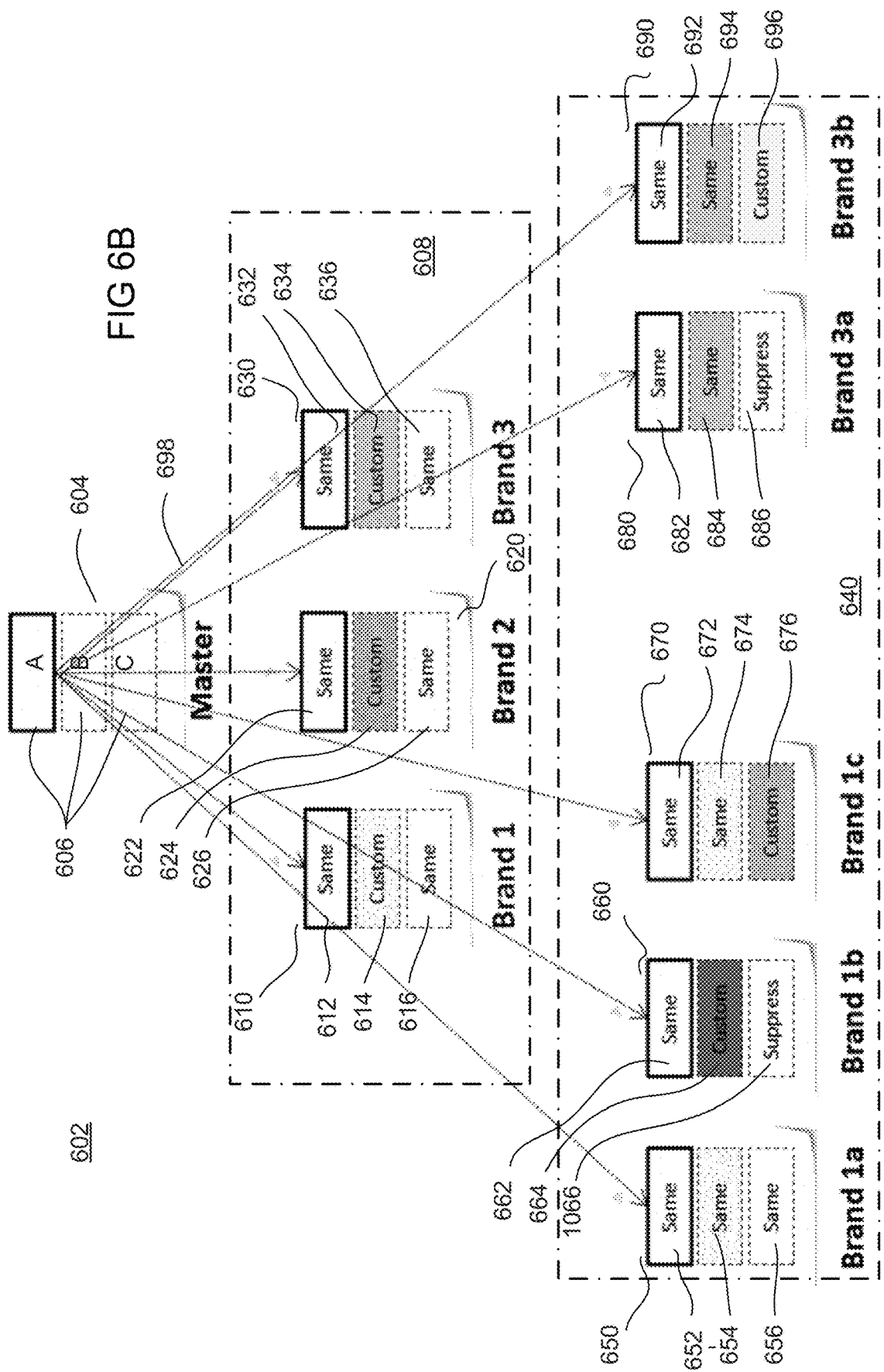

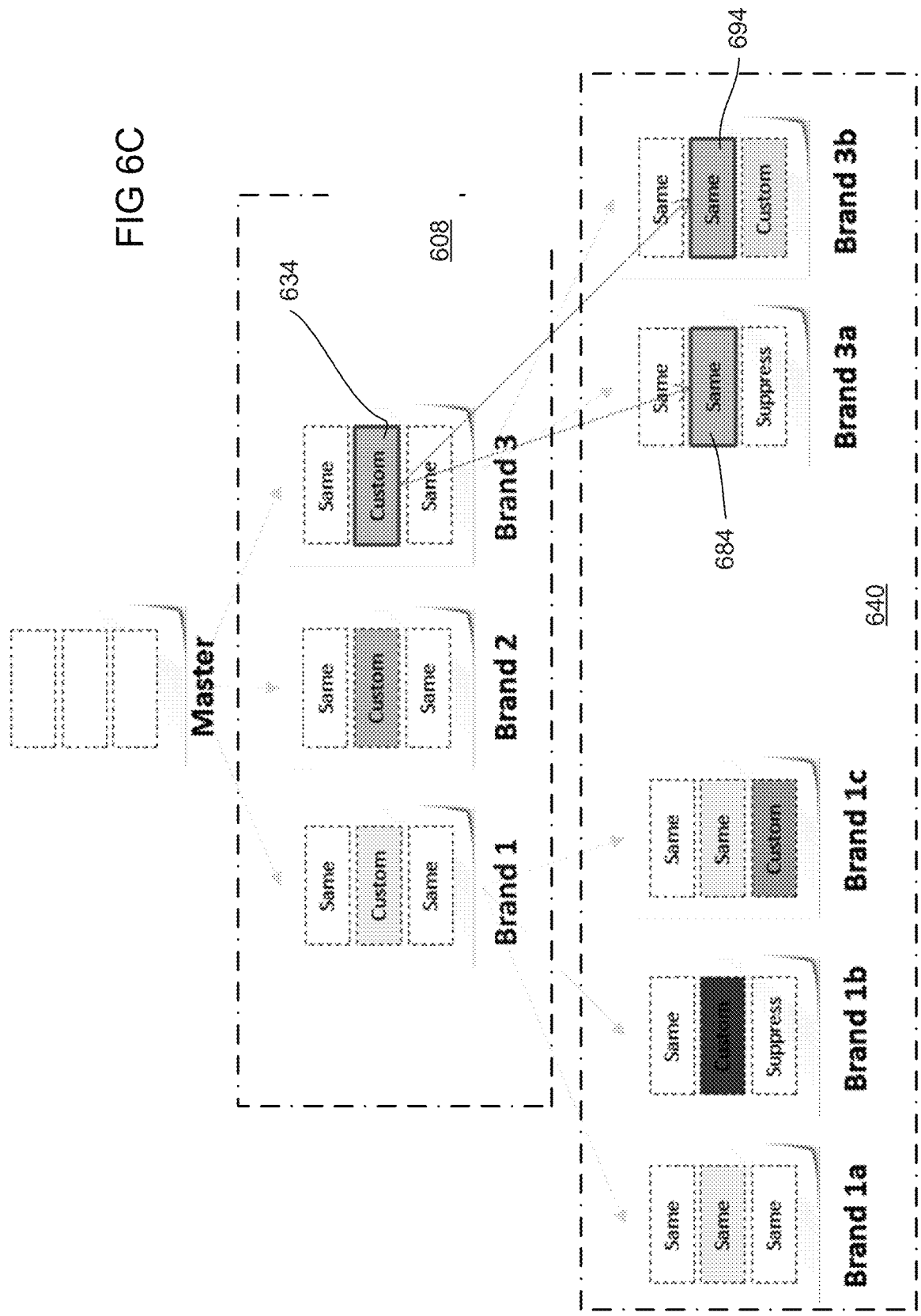

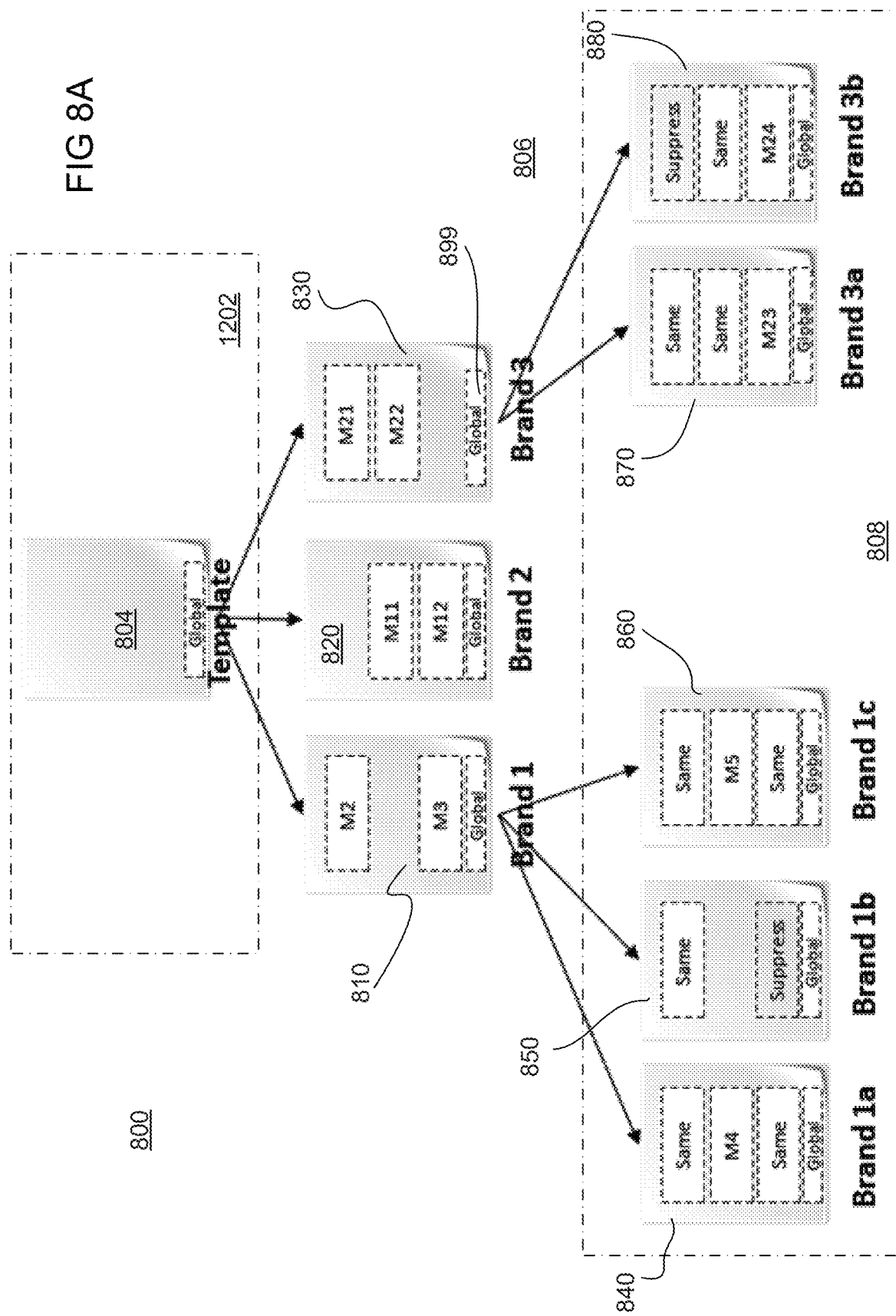

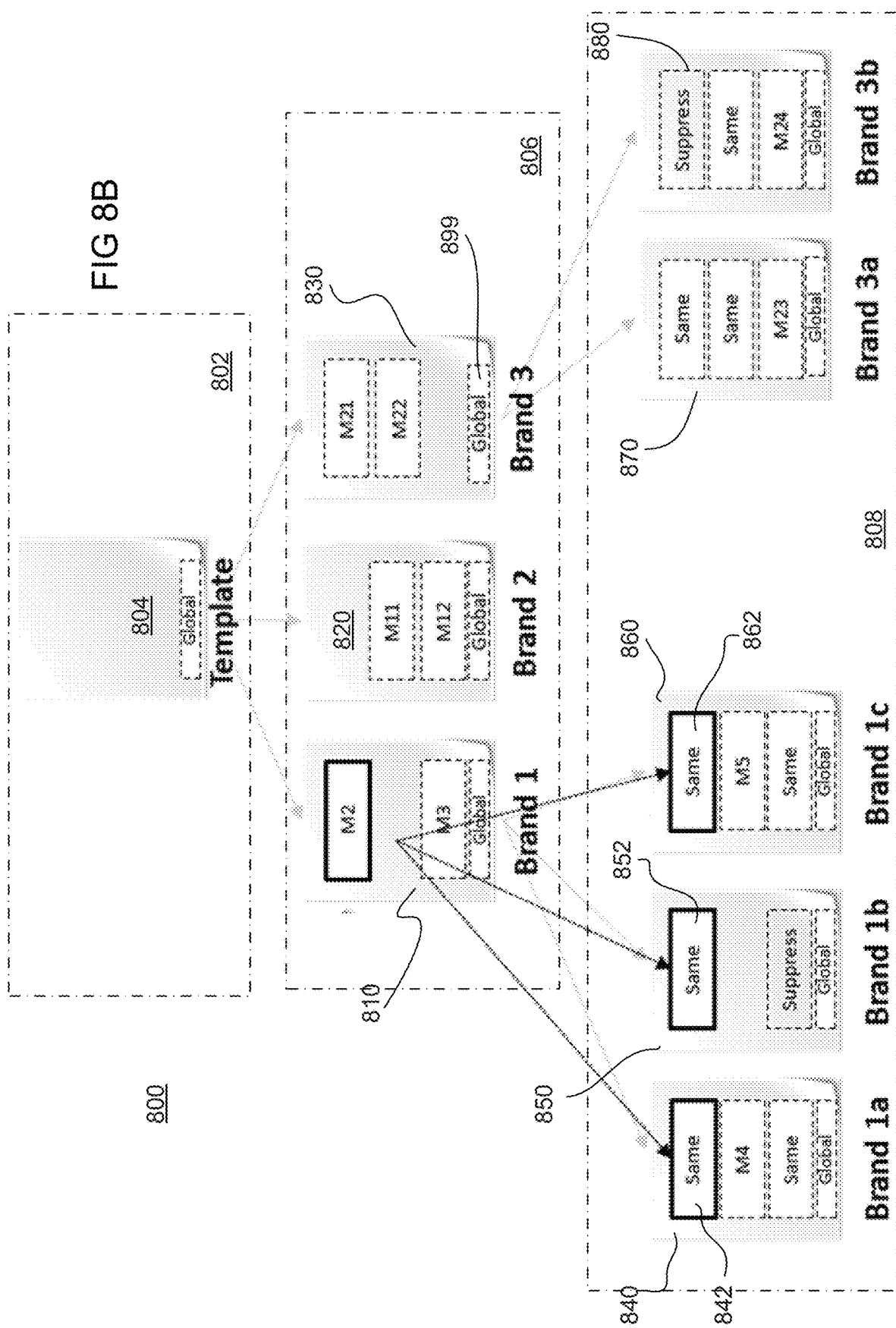

SYSTEM AND METHOD FOR VARIANT CONTENT MANAGEMENT

FIELD OF THE INVENTION

The present invention relates generally to content management. More particularly, the present invention relates to a method and system for variation and customization of content for customer communications management.

BACKGROUND OF THE INVENTION

Typically large businesses with a large customer population (for example, the financial services, banking, health care, retail, utilities, telecommunications and insurance industries) have significant difficulty providing one-to-one personalization of the information they provide to customers and prospects. Businesses can communicate with customers through many different mediums such as physical documents (e.g. paper), electronic documents, online (e.g. web-based content), telephone or face-to-face interaction. These points of contact between the customer and the business or products are commonly called touchpoints.

As the number of customers increases and in order to provide economies of scale, the content in the touchpoints must be generalized when using traditional techniques in order for the touchpoint to reach the broadest customer base. Document engineering services provide composition toolsets for delivering print, and more recently web content to large recipient bases. Examples of these deliveries include bank statements, policy documentation, legal documentation and account summaries. The variability in content delivered within a particular document has historically been limited. Fragments of data, such as, account balances, transaction summaries and recipient summaries are varied on a per customer basis; however, dramatically changing significant sections of content based on demographic, transactional or other types of stored customer data has proved to be technically difficult and/or labor intensive.

Businesses are recognizing that customer interactions are made more effective by providing relevant, personalized information to their customers during interactions rather than standard, boiler-plate content. Moreover, to improve businesses' customer relationships, there is a need to better manage these customer touchpoints. One example of software to facilitate management of these customer touchpoints is sold by Prinova Software Inc. of Toronto, Ontario, Canada under the name Messagepoint® further disclosed in U.S. Published Patent Application Number 2008/0046267 and incorporated herein by reference. Messagepoint® offers facilities for targeting content to individual recipients. For example, an investment firm may wish to promote a new fund to customers with investments greater than a defined minimum threshold who have previously invested in similar funds. Messagepoint® achieves this objective by managing content, targeting rules, messaging strategy and coordination with a composition tool responsible for generating the final media channel.

Although Messagepoint® provides businesses with useful functionality, the targeting mechanism becomes inadequate when faced with the high scale, hierarchically structured data sets applied by almost all businesses.

SUMMARY OF THE INVENTION

In accordance with an aspect of the invention, there is provided a system and machine implemented method for composing a touchpoint including a database of variants having a hierarchy stored on a computer readable medium and accessible by a document composition server; wherein each variant comprises at least one message and variation selector data; a set of selection data on the computer readable medium and accessible by the document composition server; querying the database of variants by a variation selector that selects a variant based on a match between the variation selector data and the selection data; retrieving the selected variant from the database of variants; rendering the touchpoint by placing the messages of the selected variant into a plurality of message zones of the touchpoint; and distributing the touchpoint to at least one customer device.

According to one aspect of the invention, the variation selector iteratively removes data elements from the selection data until the selection data matches a variation selector data in order to select the variant.

According to another aspect of the invention, if the variation selector has removed all of the data elements from the selection data, choosing a default template having at least one default message and rendering the touchpoint by placing the messages of the default template into the plurality of message zones of the touchpoint.

According to another aspect of the invention, at least a portion of the messages of variants lower in the hierarchy are inherited from the messages of variants higher in the hierarchy.

According to another aspect of the invention, at least a portion of the messages of variants lower in the hierarchy are customized from the messages of variants higher in the hierarchy.

According to another aspect of the invention, at least a portion of the messages of variants lower in the hierarchy suppress the messages of variants higher in the hierarchy.

According to yet another aspect of the invention, the message may have a message envelope and a message content where the message envelope contains targeting criteria, timing criteria, and priority criteria and the message content comprises: graphical, audio, video, or textual data.

According to another aspect of the invention, the customer devices can be at least one of a display, a laptop, a personal computer, a mobile phone, an AFP print streams for printing via high volume printers, and PDF output for archiving or electronic delivery.

In accordance with another aspect of the invention, a system and method for managing a hierarchy of touchpoint variants including displaying a user interface on a display for a user to modify a message contained in an edited variant; querying a list of variants by a content creator computer for variants dependent on the edited variant; and updating a corresponding message in each of the dependent variants by the content creator computer.

According to another aspect of the invention where the updating does not change messages that have a setting of suppress or customize and where the updating changes the corresponding message of each of the descendent variants to match the modified message.

BRIEF DESCRIPTION OF THE DRAWINGS

An embodiment will now be described, by way of example only, with reference to the attached Figures, wherein:

FIG. 2 is shows a schematic diagram of computing device executing instructions of the present invention;

FIG. 6A to 6C illustrate an example of inheritance used in a Structured Touchpoint variation of the present invention;

FIG. 8A to 8B illustrate an example of inheritance used in a Freeform Touchpoint variation of the present invention;

DETAILED DESCRIPTION OF THE EMBODIMENT

The present invention relates to providing hierarchically-based variant content for integrated messaging campaigns. Touchpoints are an information medium to disseminate information, point of contact or way to communicate with a user, such as a customer, potential customer, client, or individuals or organizations. Examples of touchpoints are print media, websites, email, direct mail, banner ads, bills, telephone conversations, information displayed at a kiosk, digital signage (interactive or not), advertising on billboards, a script for a customer service representative, bus stop benches, outside overhead displays, compliance documents, SEC filings, and any other channel for providing information to a target audience. The customer may be exposed to information via a letter, a website (RSS feed, tweet, Facebook® post, etc), compliance documents, email, a kiosk, or ATM (automatic teller machine), direct mail, or cellular phone text message or instant message.

Figure 1:
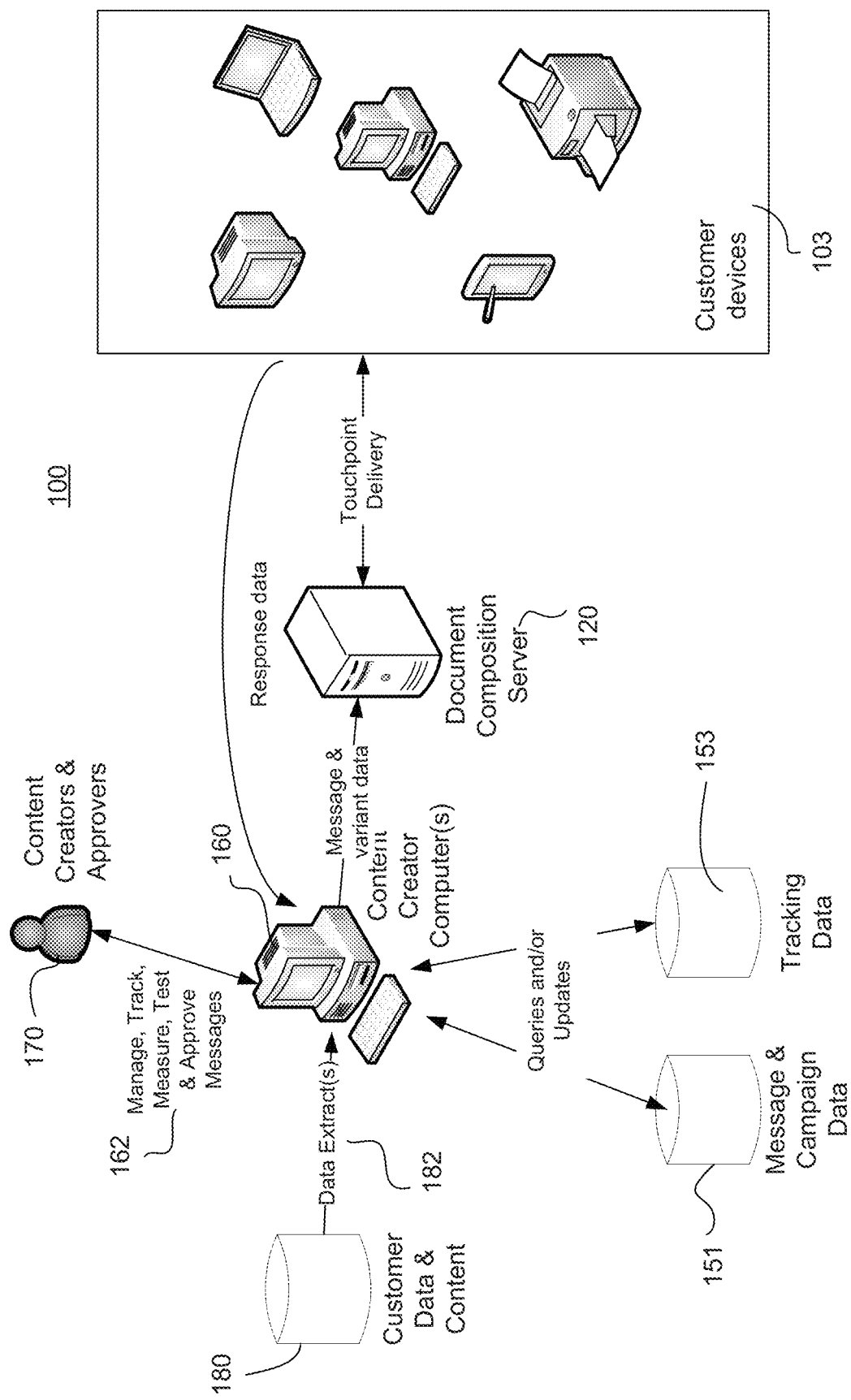
FIG. 1 is illustrates a high-level architecture of the touchpoint generating system for providing touchpoint variants in accordance with an embodiment of the invention and its operating environment.

FIGS. 1 and 2 illustrates one embodiment of the system for generating a plurality of touchpoints. As shown in FIG. 1, system 100 includes customer data and content databases 180, business and IT users 170, content creator computer(s) 160 executing the instructions of the present invention, message and campaign database 151, tracking database 153, document composition server 120 and customer devices 103. Each of these is described in more detail below.

The content creator computer(s) 160 has a number of physical and logical components, including one or more central processing units 244 (referred to hereinafter as "CPU"), non-volatile random access memory ("RAM") 248, an input/output ("I/O") interface 252, a network interface 256 (wired or wireless), non-volatile storage 260, and a local bus 264 enabling the CPU 244 to communicate with the other components. The CPU 244 executes an operating system and the application instructions of the present invention. RAM 248 provides relatively-responsive volatile storage to the CPU 44. The I/O interface 252 allows for input to be received from one or more devices, such as a keyboard, a mouse, a touch screen, etc., and outputs information to output devices such as a display and/or speakers. The network interface 256 permits communication with other computing devices such as, for example, the document composition engine 120. Non-volatile storage 260 stores the operating system and programs including computer-executable instructions for implementing the instructions of the present invention, as well as data received by the external databases, and data being processed by the instructions. During operation of the content creator computer(s) 160, the operating system, the programs and the data may be retrieved from the non-volatile storage 260 and placed in RAM 248 to facilitate execution.

The content creator computer(s) 160 is operated by the content creator(s) (and optionally approvers) 170 in order to manage, track, measure, test and approve messages 162 as well as plan and layout variants for the touchpoints using the I/O interface 252. The content creator computers(s) 160 receives data from customer data and content database 180 over the network interface 256. The customer data and content data are used by the content creator 170 in order to create the variation selectors for each message and each touchpoint. When the content creator 170 is creating the touchpoint variants and messages, the application software performs queries and updates to the message and campaign database 151 over the network interface 256. The message and campaign database 151 stores all the previously created message and touchpoint variants. The messages and variant data are delivered to the document composition server 120 over the network interface 256.

The document composition server 120 is typically a processing system similar to the one shown in FIG. 2. The server 120 receives one or more files as inputs from the content creator computer 160 and generates as outputs one or more rendered touchpoint variants for a targeted customer device 103. For example, the same variant can be rendered for customer devices such as a display, laptop, personal computer, mobile phone, or AFP print streams for printing via high volume printers, or PDF outputs for archiving or electronic delivery. For example, the server 120 can implement a web page delivery module that generates and delivers web page data that includes the message data and touchpoint variants generated by content creator computer 160. Similarly email delivery module generates and delivers an email including the message data. One of skill in the art would know that other modules specific to other communication mediums or protocols can also be implemented such as an SMS text messaging module, or a Twitter™ module, or a Facebook® module, etc.

To assess the performance of each touchpoint variant, the content creator computer 160 receives response data from customer devices 103 and updates a tracking database 153 that stores tracking data relating to feedback from customers or other information relating to who received the message data, who responded to the message data and what the response was. The response data may be input from members of the target audience who have viewed the message data and provided a comment, request for additional information or other feedback.

The content creator computer 160, in conjunction with the document composition server 120 contain software instructions for creating, managing and composing hierarchies as further described below.

Business and IT users 170 are typically business management personnel and/or IT personnel that interface with the customer data and edit, revise, measure, approve, test and track the dynamic message content. The revisions or approvals of the messages are provided to the messagepoint module 160 via the network interface 256.

Figure 3B:
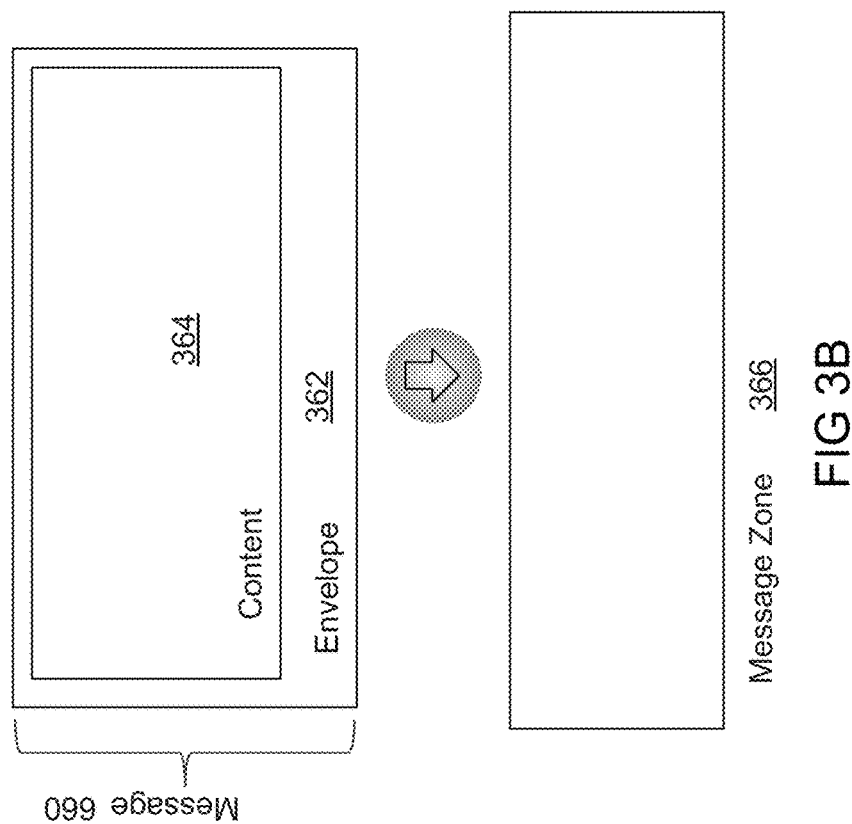
FIG. 3B is a representational diagram of a message used in an embodiment of the present invention.
Figure 3A:
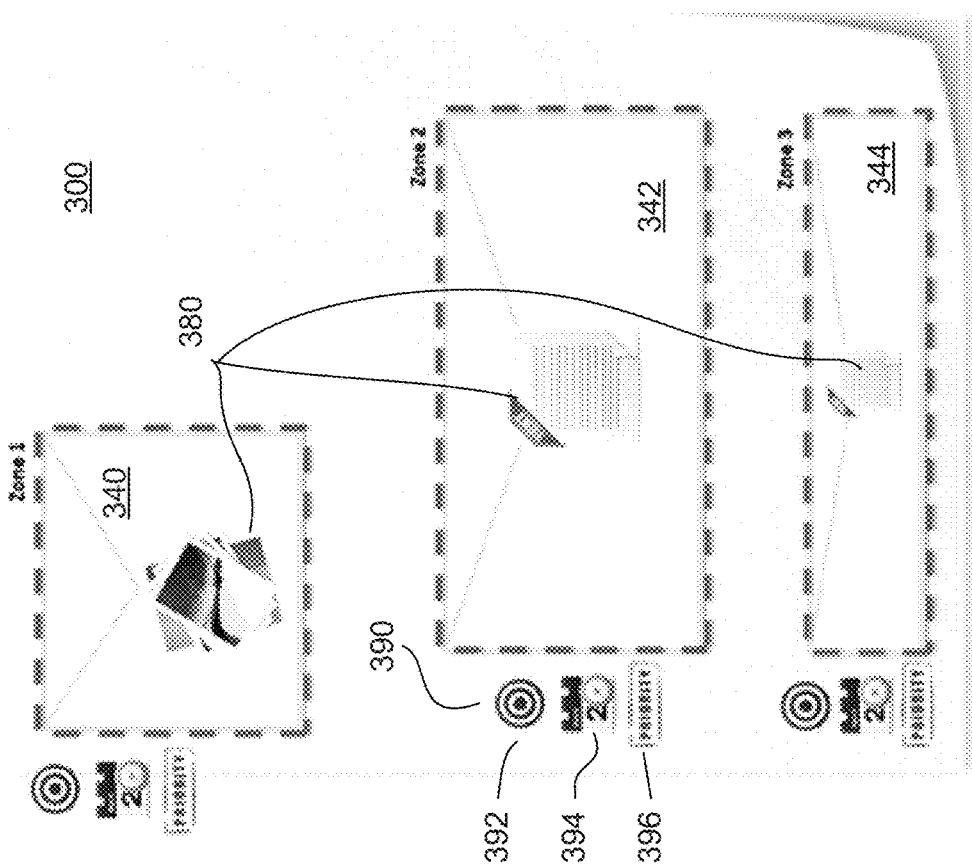
FIG. 3A is a representational diagram of a touchpoint having a plurality of message zones.

To improve understanding of touchpoint variants, an example of a customer touchpoint layout 300 according to the present invention will now be described. FIGS. 3A and 3B show a representative example of a customer touchpoint layout 300. The touchpoint layout 300 has three zones: the first message zone 640 is a graphic zone; the second message zone 342 is a text zone such as the main body; and the third message zone 344 is also a text zone such as a document footer, disclaimer, etc. Each zone is able to receive a message 360 shown in FIG. 3B. Each message 360 is comprised of an envelope 362 and content 364. The envelope 362 contains information on the targeting, timing and priority for the message 360. The message 660 is received by message zone 366 in the touchpoint.

Targeting attribute 392 determines if the target individual is to receive the message content 364. For example, one message (A) envelope targeting attribute 392 may specify 'age greater than 25', another message (B) envelope targeting attribute 392 may specify 'net worth greater than $50,000.' Depending on the data associated with an individual that individual will fall into one of the following: receives no content for this zone (<25 years of age and net worth is <$50,000); receives content for message A but not message B (>25 years of age and net worth<$50,000); receives content for message B but not message A (<25 years of age and net worth>$50,000); and receives content for both message A and message B (>25 years of age and net worth>$50,000).

Priority attribute 396 determines which message takes precedence in the event not all applicable messages will fit in the zone area, e.g. message (A) envelope priority attribute 396 is higher than message (B) envelope priority attribute 396. In the event that both message A and message B qualify (by targeting), message A will be fit with higher priority resulting in one of the following: receives content for message A but not message B (zone not big enough for both messages); receive content for message A and message B (zone was big enough for both messages); and receives no content (zone not big enough for message A.

Timing attribute 394 determines which messages are eligible for qualification (targeting) at the time the touchpoint is composed. For example, if the timing attribute 394 for message (A) envelope is January 2014-February 2014 but the touchpoint is being composed on December 2013, then message A will not be considered and message A content will not be delivered regardless of targeting or priority attributes.

The content 364 contains images, text, diagrams, or any other content the content author/creator desires to be displayed in the message zone 366. The content 364 can also contain no information if the message 360 is to suppress the display in the zone which receives it.

Once a touchpoint layout 300 has been created, a message 360 must be generated for each variation desired by the content author. The variants are typically determined by first segmenting the recipient base, that could number in the millions, into unique subsets. For example, a recipient base could be segmented based on carrier, contract, group or region, or division. From this perspective each segment of interest is receiving a complete set of content which may be slightly or significantly different than the set of content received by another segment. The content creator then must determine if each segment requires entirely new messaging and/or targeting in order to determine the number and type of variants required. If a set of variants require only minor tweaks to the content, then the same layout and structure of the touchpoint can probably be maintained the same while changing the messaging content for each particular segment. If necessary, every aspect of the touchpoint can be varied segment to segment.

The need to target the message by segment can be met by applying targeting to content such that every segment is represented; however, the end result is a massive multiplier of content with little correlation. Attempting to decipher the content for any particular variation is unintuitive, labor intensive and inefficient. Variant content management brings order to this problem of complexity and permits elaborate variant interrelationships while remaining easily discoverable and intuitive. From the perspective of the content author each variant becomes is its own snapshot of content, interacting with other variant content as necessary, but contained and managed independently.

Figure 4:
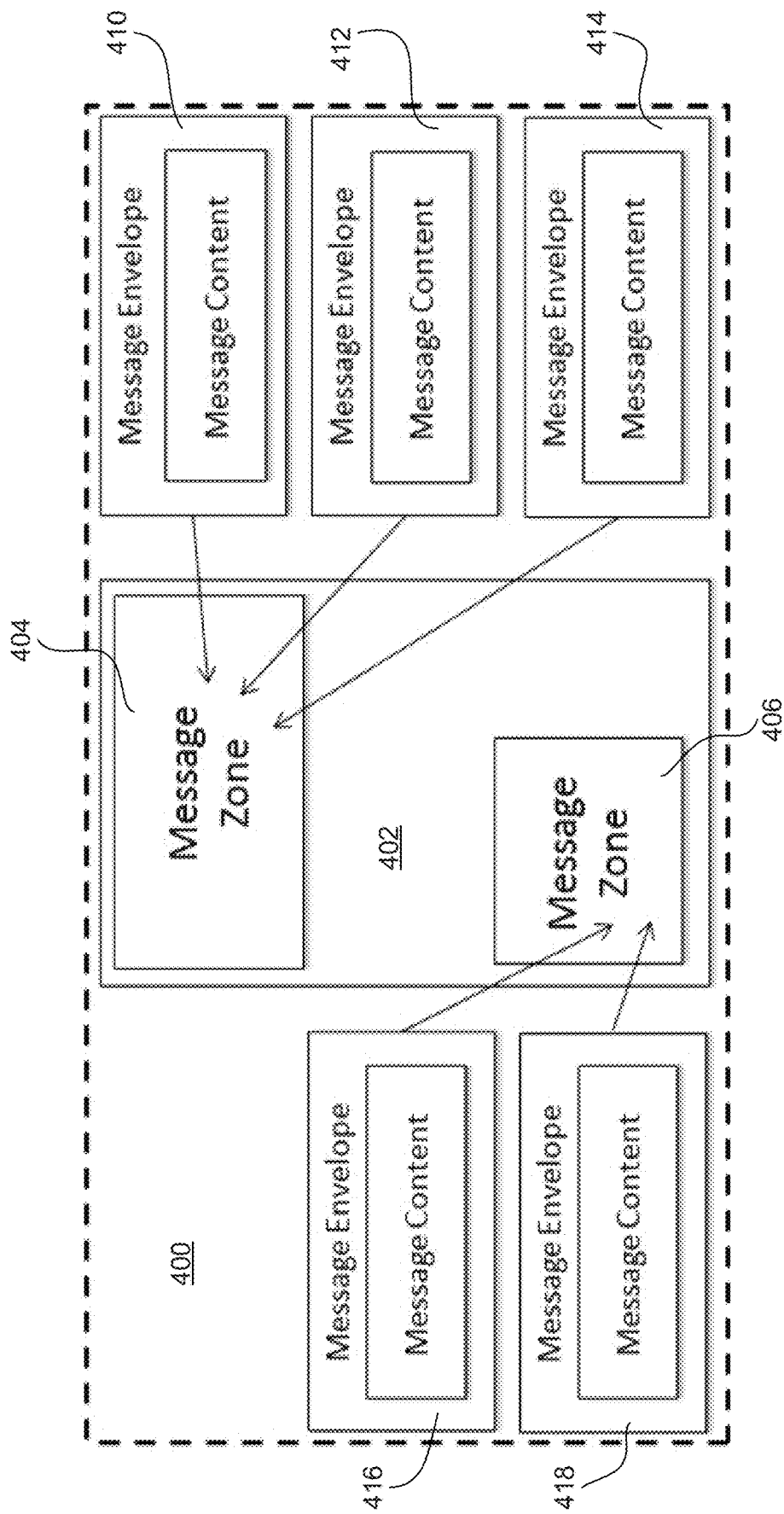
FIG. 4 is a representational example of a Standard Touchpoint with no variation.

There are two models of variation: Structured Touchpoint variation, and Free-form Touchpoint variation. Both models of variation start with a Standard Touchpoint. The Standard Touchpoint is used when the segment is relatively uniform and the content creator requires a simple touchpoint requiring no variation. The Standard Touchpoint is driven through individual messages using targeting rules and a single touchpoint layout. An example of a Standard Touchpoint is demonstrated in FIG. 4. A touchpoint 402 having two message zones 404 and 406 is capable of receiving messages. Message zone 404 receives messages 410, 412, and 414 whereas message zone 406 receives messages 416 and 418. Targeting, priority and/or timing criterion determine which messages are displayed in the message zones 404, 406 for a particular customer based on the customer profile data retrieved from the customer data and content database 180. Once a Standard Touchpoint has been created, the content creator may start adding variations called touchpoint variants to this master template. A touchpoint variant is a set of message variations that when selected together form a unique touchpoint. Touchpoint variants that depend on other touchpoints are said to be 'children' of the parent touchpoint.

The Structured Touchpoint variation is used for complex touchpoints with many variants and content is driven by unique definitions (representing customer segments or sub-segments) at the touchpoint level. Mutually-exclusive segments are used to define the touchpoint variation as well as the universe of associated content for a specific touchpoint variation. The majority of the content and targeting is very similar or even the same between touchpoint variations with only minor tweaking and customization is required. The messaging structure is clearly defined at the top template level and propagates down to the variants below. A large amount of content is shared, referenced, or inherited across multiple touchpoints and across multiple segments. A collection of messages for a given variant is very similar to other variants in a collection of touchpoints allowing a consistent structure to be used between the variants. The content can vary within the structure and content inheritance is supported.

Figure 5:
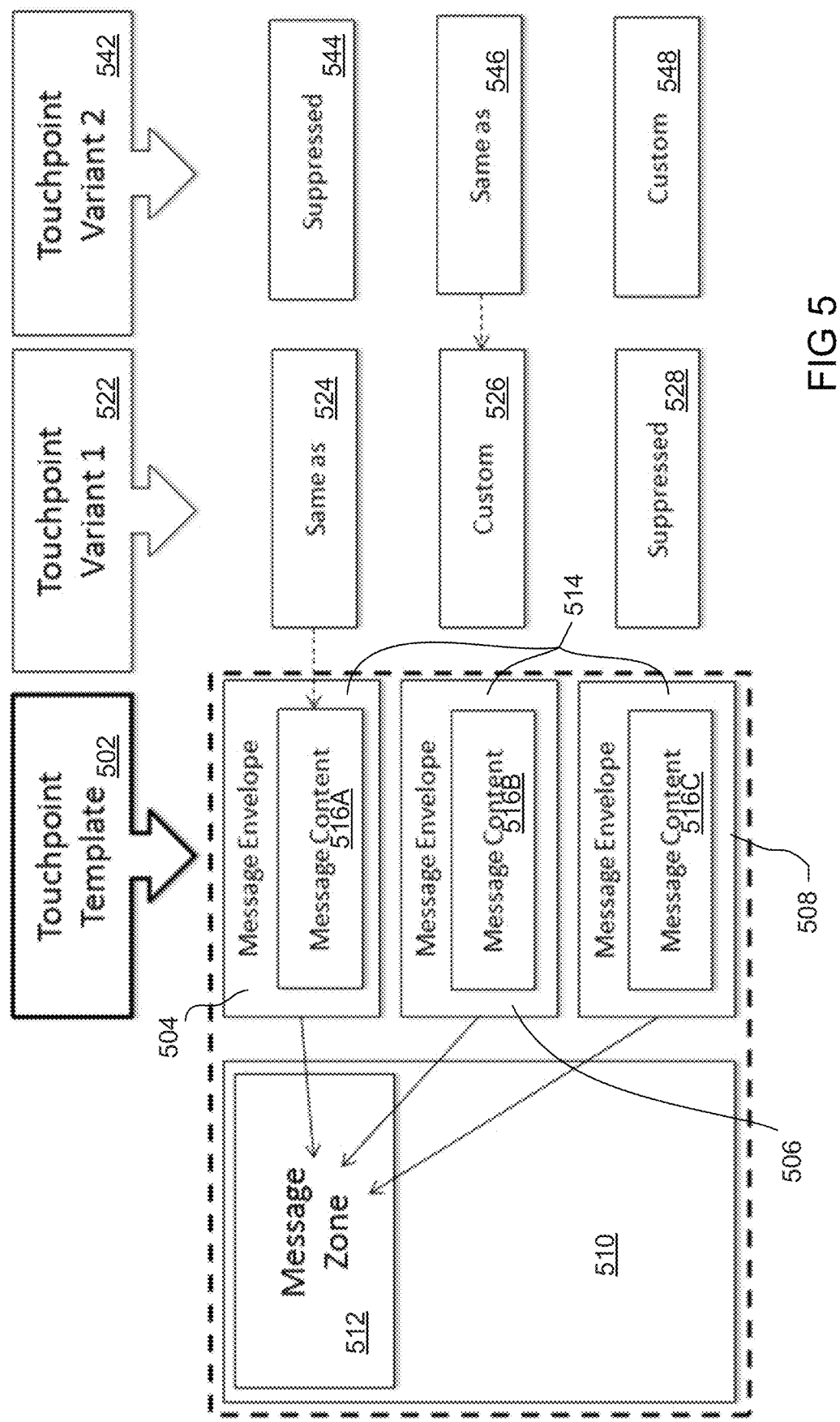
FIG. 5 illustrates an example of how a Structured Touchpoint variation operates.

FIG. 5 shows an example of how a Structured Touchpoint variation functions. A touchpoint 510 with a fixed message zone 512 is able to receive messages comprising the content and envelope. A touchpoint template 502 is the equivalent of the Standard Touchpoint and has three messages 504, 506, and 508 with each message having a message envelope 514 having targeting, timing and priority criteria for the message as well as default message content 516 A, B, C which can be the same content for each message or different content for each message. Because this is a Structured Touchpoint, all of the children variants are limited to having only three messages and all of the children must have the same message envelope 514 as the messages of the touchpoint template 502.

When a touchpoint variant is created, the content creator is able to change only the message content 516 A, B, C of the touchpoint template 502. The content creator is unable to modify any of the message envelopes 504. For example, touchpoint variant 1 522 has the message content 524 which is the same as the template message content 516A meaning that the message content 524 has inherited or references the template message content 516A. For message content 516B, the touchpoint variant 1 522 has message content 526 which has been customized and overrides the touchpoint template 502. Finally, the message content 528 of touchpoint variant 1 522 has suppressed the default message content 516C of the touchpoint template 502. Suppressing the content causes the default touchpoint template to not appear in the message zone.

Touchpoint variant 2 542 has been created dependent on touchpoint variant 1 522 and thus variant 2 542 inherits message content from variant 1 522 unless otherwise specified. For example, the message content 546 is inherited from message content 526 of touchpoint variant 1 and therefore will present the same customized content. Message content 544 is set to suppress and thus will present neither the touchpoint template message content 516A nor the variant 1 message content 524. Finally, message content 548 has been customized to display different material than the touchpoint message content 516C and has overridden the suppression of touchpoint variant 1's message content 528.

Figure 6A:
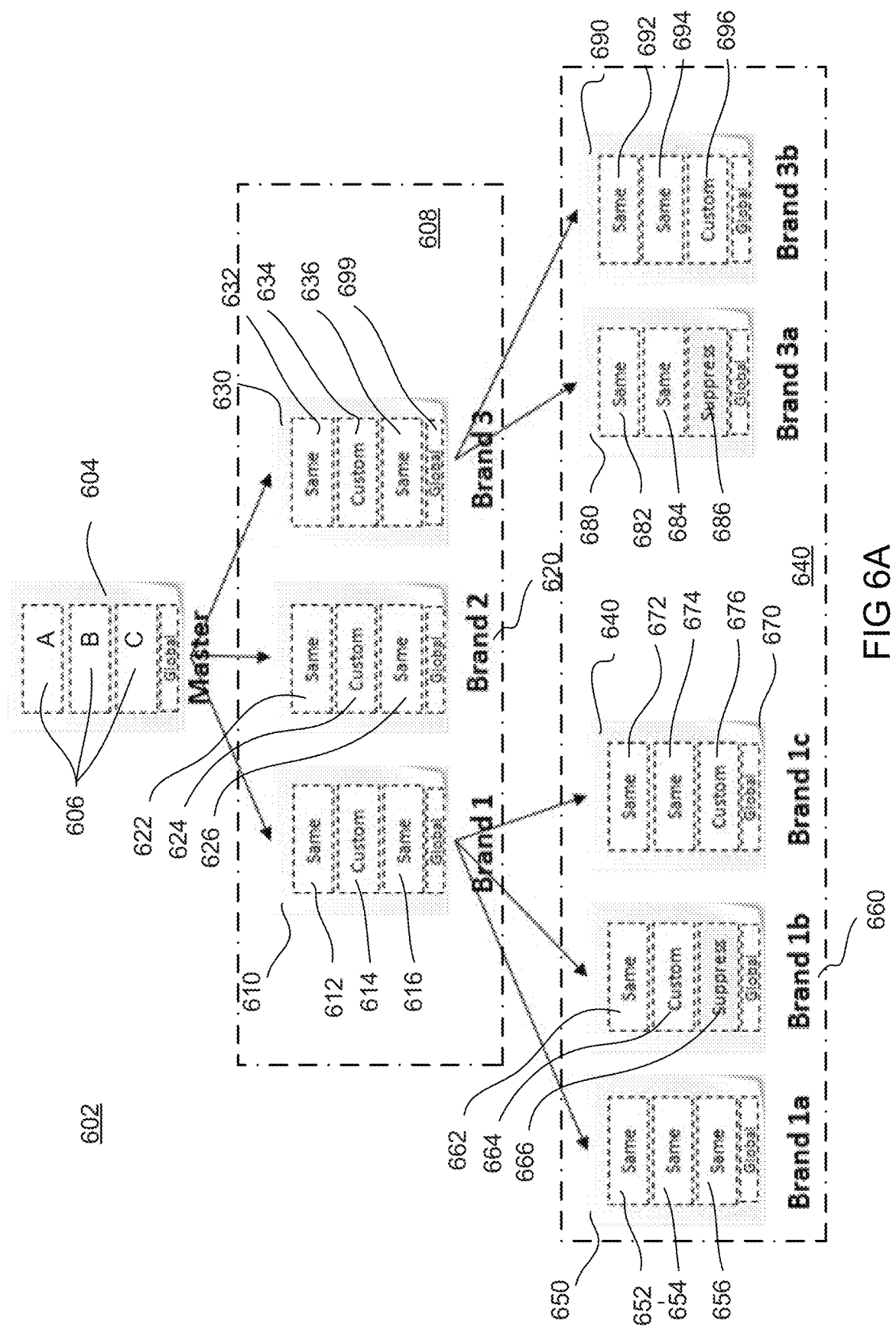

FIG. 6A shows another example of a Structured Touchpoint variation demonstating inheritance. A tree structure 602 having three levels is presented where a master template variant 604 (corresponding to the Standard Touchpoint) with three messages 606A to 606C is at the highest level of the tree. The next level 608 has three brands variants 610, 620, 630 respectively with the corresponding messages of the master template variant 604 (612, 614, 616 for brand variant 610, 622, 624, 626 for brand variant 620 and so forth). Some of the messages (612, 616, 622, 626, 632, 636) are set as the same as the messages 606 of the master template variant 604. While other messages (614, 624, 634) are set as customized messages that are different than the master template variant 604.

The lowest sub-brand level 640 has five variants where variants 650, 660, and 670 are dependent on the parent variant 610 and variants 680 and 690 are dependent on variant 630. For the variant dependent on variant 610, the messages 652, 654, 656, 662, 672 and 674 are set as the same as the corresponding messages in variant 610. Variants 664 and 676 have been customized and contain different message content than variant 610. Finally, variant 666 has been suppressed and will override the corresponding messages of the master 602 and variant 610 to not be displayed. For the variants dependent on variant 630, the messages 682, 684, 692, 694 will be the same as the corresponding parent variant messages. Message 686 has been suppressed and will display no messages and message 696 has been customized.

In FIG. 6B, a change is made to the message content of 606A and the dotted lines 698 demonstrate how the change is propagated throughout the tree structure. Any of the dependent messages that has the message attributed set as "same" will exhibit the change in the master variant 604. When the message content of changed message 606A, the same change does not have to be made manually to each of the dependent variants. Further, approval of the change only has to be made once further reducing workload of the content creators.

In FIG. 6C, a change is made to message content 634 in the middle level 608 which are subsequently propagated to 684 and 694 in lowest level 640. This figure demonstrates that changes in intermediate levels are also propagated to lower levels. Although the example shown herein has three levels, it is clear that more levels are possible and each variant could contain more than three messages allowing for increasingly complex touchpoint generation.

In FIGS. 6A to 6C, each of the variants has a global message 699 that is used to enforce standardized content across all variants. All other messages are considered dynamic messages that are used to drive variable content within a touchpoint variation. For example, dynamic content may disclaimer text that varies by state or region.

The Free-form (or Flexible) Touchpoint variation is used for complex touchpoints with many variants where a majority of the content and targeting is different between the touchpoint variations. It is used when little commonality exists apart from core purpose and targeted segment for the touchpoint. The messaging structure can be re-defined and varied throughout the variation hierarchy, but the content variation is driven at the message level for each touchpoint. Similar to the Structured Touchpoint variation, the Flexible Touchpoint variation use mutually-exclusive segments to define the universe of potential touchpoint variations; however, they do not determine the individual content for each variant as little to no content is shared or inherited across multiple touchpoint variations or across multiple segments.

The individual content is driven by the message-level targeting of each touchpoint variation allowing each variation to have their own unique structure and content. A collection of messages for a given variant can be fundamentally different between variants in a collection of touchpoint variations. Nevertheless, message inheritance is supported. Through the use of message and content inheritance, the content creator only has to identify and manage exceptions across all the variations versus having to identify and manage all the rules. If a change is made at a higher level in the inheritance chain, the change only has to be approved at that point at which time it is propagated everywhere automatically.

Figure 7:
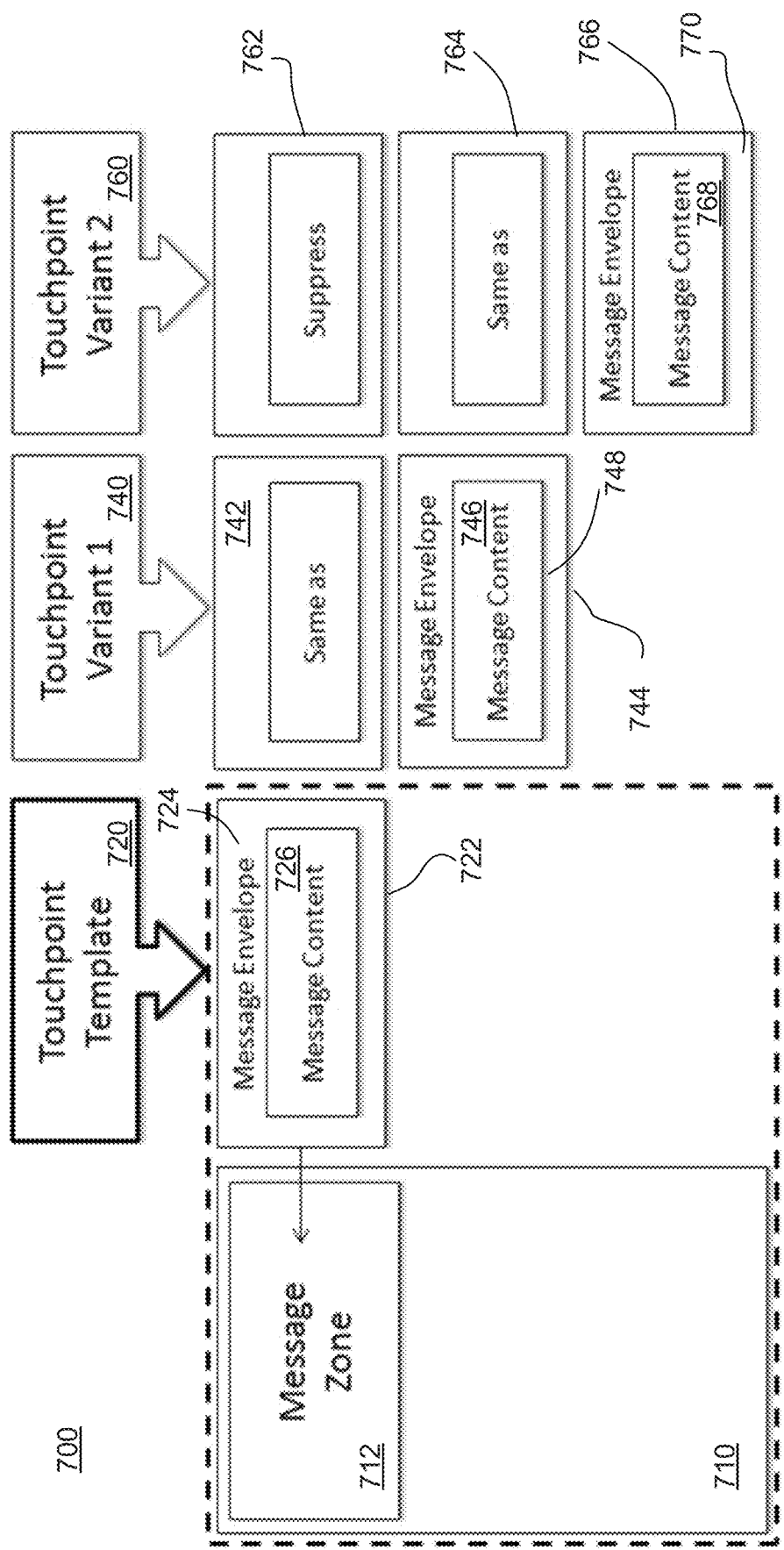
FIG. 7 illustrates an example of how a Freeform Touchpoint variation operates.

FIG. 7 shows an example of how a Flexible Touchpoint variation functions. A touchpoint 710 has a message zone 712 capable of receiving messages comprising a message envelope and message content. A touchpoint template 720 has a single message 722 having a message envelope 724 and message content 726. Touchpoint variant 1 740 has two messages 742 and 744. In a Structured Touchpoint Variation, this would be prohibited as the touchpoint template 720 has a single message 722. Message 742 is set to be the same as the message 722 of the touchpoint template 720. Message 744 is new and adds additional message content 746 and message envelope 748 not present in the touchpoint template 720. Touchpoint Variant 2 760 has three messages 762, 764, and 766. Message 762 is set to suppress the message 742 and thus will not display this message. Message 764 has been set to be the same as message 744. Finally, an additional message 766 has been newly added containing additional message content 768 and message envelope 770. As one can see, Free-form Touchpoint variation allows addition and removal (by suppression) of touchpoint messages at any level of the hierarchy allowing for very flexible touchpoint variation.

Turning to another example shown in FIG. 8A, a three level hierarchy 800 is presented. The highest level 802 corresponds to the Standard Touchpoint and has a template variant 804 containing no message structure. The next brand level 806 has three variants 810, 820, and 830. Variant 810 has two messages M2 and M3; variant 820 has messages M11 and M12; variant 830 has messages M21 and M22 all of which have a message envelope and message content (not shown). The lowest sub-brand level 808 has variants 840, 850 and 860 dependent on variant 810 and variant 870 and 880 dependent on variant 830. Variant 840 is set to inherit messages M2 and M3 from variant 810 but has the additional message M4 added in between these two messages. Variant 850 inherits message M2 from the parent variant 810 and suppresses message M3 to prevent its display. Variant 860 inherits messages M2 and M3 and inserts message M5 between them. Variant 870 inherits messages M21 and M22 from the parent variant 830 and adds the new message M23. Finally, variant 880 inherits variant M22 but suppresses message M21 and adds the new message M24.

FIG. 8B demonstrates and example of inheritance when message M2 in variant 810 is changed. The new content and/or envelope of M2 propagates to variants 840, 850 and 860 to change messages 842, 852 and 862.

In FIGS. 8A to 8B, each of the variants has a global message 899 that is used to enforce standardized content across all variants. All other messages are considered dynamic messages that are used to drive variable content within a touchpoint variation. For example, dynamic content may disclaimer text that varies by state or region.

Figure 9:
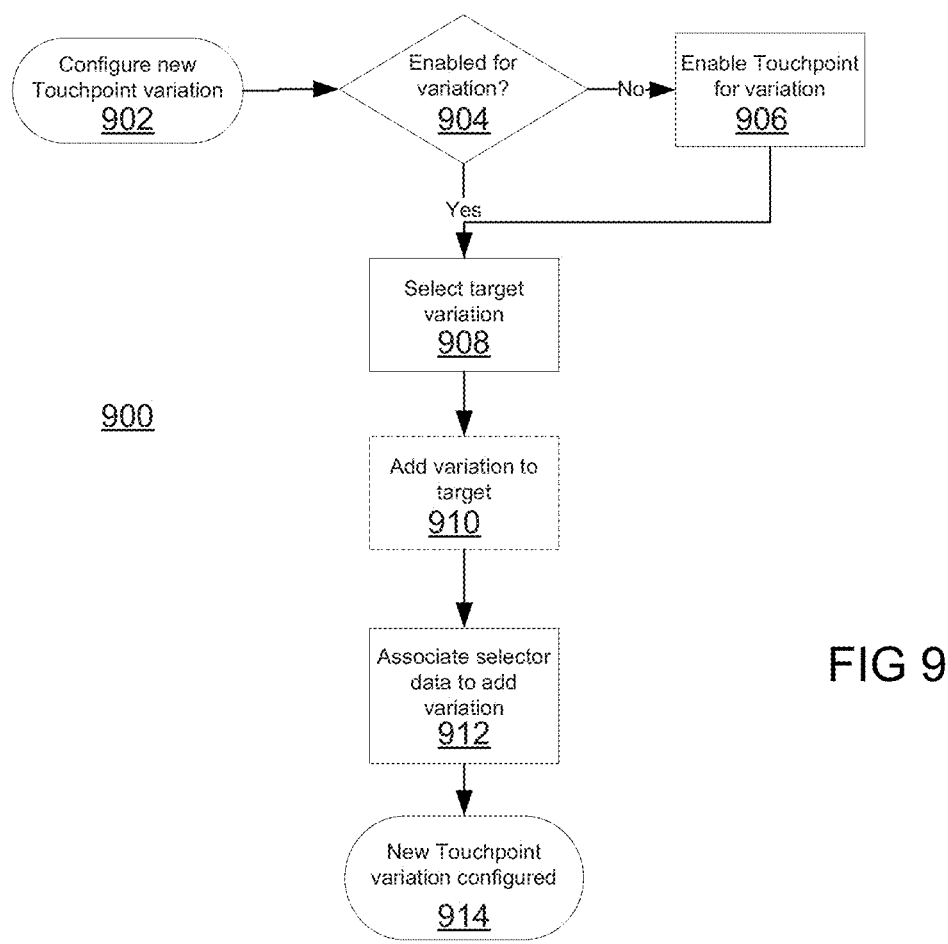
FIG. 9 is a flowchart for configuring a new Touchpoint variation of the present invention.

FIG. 9 shows a flow chart 900 for when a new touchpoint variation is created. Generally, the content creator selects an existing touchpoint variant (or the Standard touchpoint if not other variants exist) that will become the basis for a new touchpoint variation which enters the flow chart 900 at configure new touchpoint variation 902. A check is performed to see if the touchpoint has been enabled for variation 904. If not, the process proceeds to enable the touchpoint for variation 906, which is further described in reference to FIGS. 10A and 10B below. Once the touchpoint has been enabled for variation (either previously or by step 906), the process proceeds to select target variation in step 908 where the content creator selects a preexisting target variant as the parent for newly created variant. Following selection of the parent variant, the content creator may optionally add variation to the target 910 through modification of the parent variant's layout. Finally, selector data is associated to the added variation in step 912 as further described in FIG. 11 below. Once the variant has been added and configured at step 914, content authors can then proceed to modify message content for the variant (structured model) or add message content to the variant (free-form model).

Figure 10A:
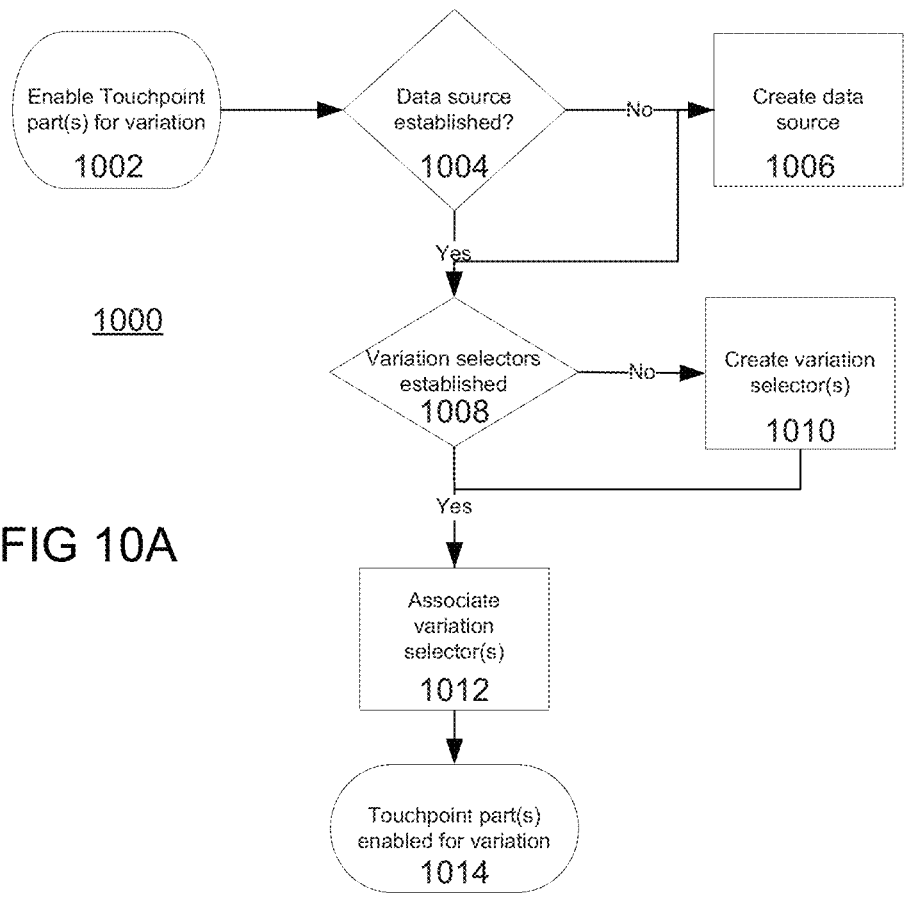
FIGS. 10A and 10B are flowcharts for enabling variation of the present invention.
Figure 10B:
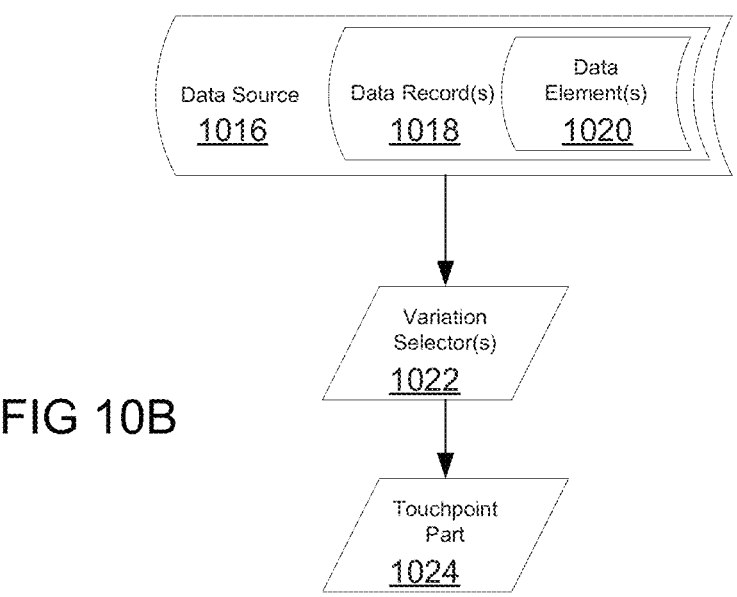

FIGS. 10A and 10B show a flow chart for enabling a touchpoint for variation. When the content creator selects a touchpoint part for variation, the algorithm 1000 starts at enabling touchpoint part(s) for variation 1002. A check of whether a data source 1016 has been established 1004 is conducted. The data source 1016 comprises data records 1018 typically corresponding to individuals and each data record 1016 has a set of data elements 1020 such as names addresses, transactions, customer identifiers. The data source 1016 is typically comprised of columnar or delimited flat file data or as XML data but could be more advanced types of data sources such as SQL databases, Filemaker® databases, etc.

The data source 1016, having data records 1018 and data elements 1020, is used to determine when the particular variation becomes active (specifically shown in FIG. 10B). Once the data source 1016 is established, a check is made to determine if the variation selectors have been previously established 1008. If the selectors have not been established, the content creator is asked to generate the selectors 1010. To generate the selectors, the content creator selects data elements 1020 in the data source 1016 at step 1022. For example, the content creator may select the data element 1020 fields for Gender, Age, and Income.

When the variation selectors have been created either previously or via step 1010, the content creator then associates the variation selectors to the variant 1012 at a particular touchpoint part 1024. During the association, the content creator prioritizes the selectors to determine which of the selectors is least important. For example, the selectors may be associated with the touchpoint as Gender:Age:Income where Gender is most important and Income is least important.

Figure 11:
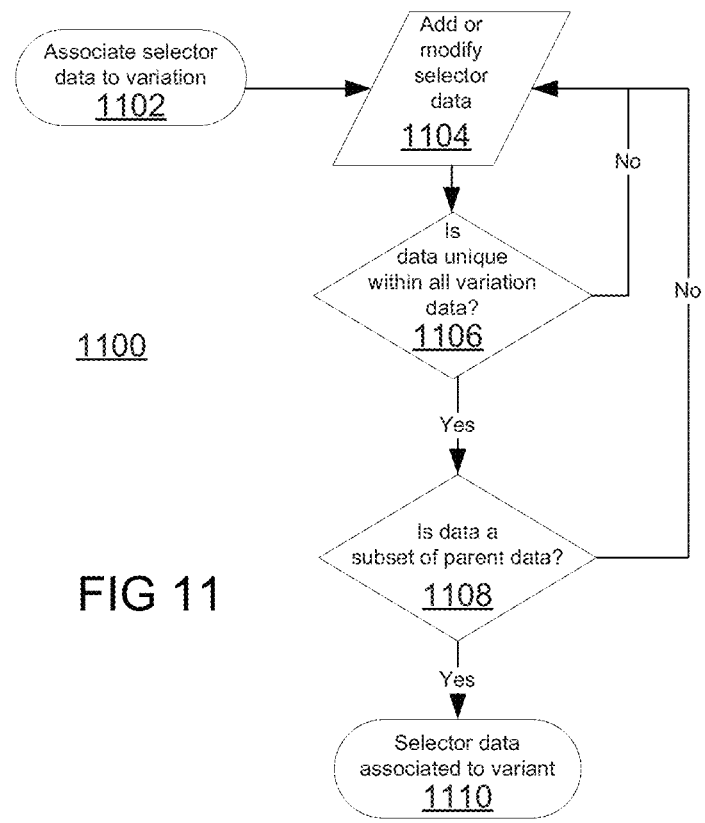
FIG. 11 shows a flowchart where selector data is associated to the newly created variant of the present invention.

FIG. 11 shows a flowchart 1100 where selector data is associated to the newly created variant. Selector data is a subset of the total data source 916 used to target a particular variant in order to select it. The purpose of the selector data is to have a data definition that will be unique within all the variants so only a single variation may be matched when selecting content. The process begins at 1102 when the process 912 from FIG. 9 calls the flowchart 1100. At step 1104, the content creator specifies selector data from the variation selectors using a manual data entry or through an import process. Since the definitions can be complex, in order to simplify manual entry the parent selector data may be displayed and the content creator may select values to extend.

The selector data is compared to the selector data from previously generated variants to determine if the current selector data set is unique 1106. If the selector data set returns more than one variant, then the process returns to step 1104 where the content creator is asked to add or modify the selector data. If the data is unique, the process proceeds to step 1108 where the selector data determines if the selector data set is a subset of the parent variant's data set. If the selector data set is not a subset of the parent variant's data set, then the content creator is again asked to add or modify the selector data at 1104. If the selector data set is a subset of the parent variant's data set, then the process exits and the selector data set is associated with the newly created variant 1110. Requiring the selector data definitions to be a subset of their parent variation selector data definition brings logical order to the variation layout.

Using the Gender:Age:Income example from FIG. 10, the content creator can specify selector data only from Gender, Age, and Income. Furthermore, each of the criteria must be mutually exclusive at each level of the hierarchy such as Segment A1a and A1b having non-overlapping income ranges as seen below. This ensures that any particular individual or customer is represented by only one segment.
  Master
    Segment A: Gender: Male
      Segment A1: Age 0-50

Segment A1a: Income 0-100,000
Segment A1b: Income>100,000
Segment A2: Age 50+
Segment B: Gender: Female
Segment B1: Age 0-35
Segment B1: Age 35+

Figure 12:
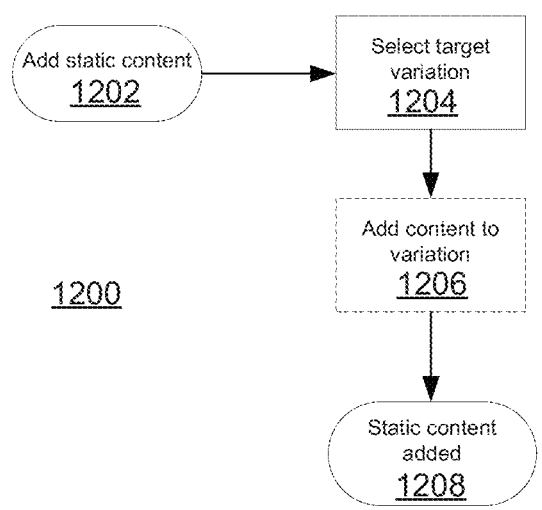
FIG. 12 is a flowchart for adding static content to the particular variant of the present invention.

Once the touchpoint variation has been created, the content creator adds content to the layout. FIG. 12 shows a flowchart 1200 for adding static content to the particular variant. Static content is content that may belong to any particular variant but has no ancestor or descendant relationship to other variation content. Thus, the static content is local to the particular variation. The content creator selects a user interface element activate adding static content and enters the flowchart at step 1202. The content creator then selects a target variation 1204 where the static content is to be added. The content creator can optionally add static content to the variation 1206. If the content creator changes their mind, they can cancel. In any event, the routine exits at 1208 with or without adding static content.

Figure 13:
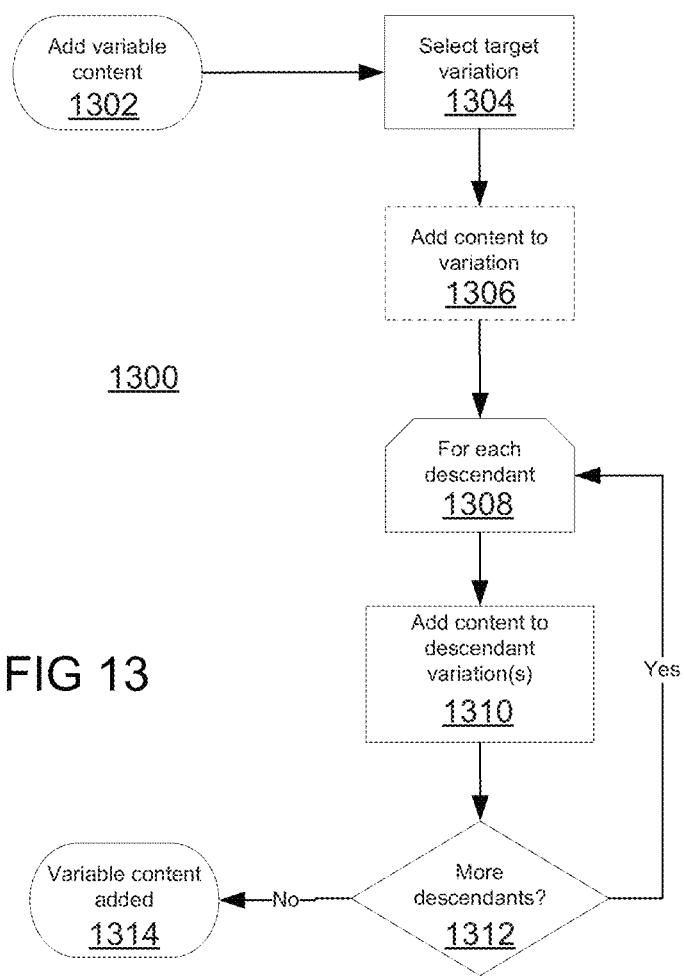
FIG. 13 is a flowchart for adding variable content to the touchpoint layout of the present invention.

FIG. 13 shows a flowchart 1300 for adding variable content to the touchpoint layout. Variable content is applied to a particular variation and all associated descendant variations. Similar to adding static content, the content creator selects a UI element to activate adding variable content and enters the flowchart at step 1302. The content creator then selects a target variation 1304 where the variable content is to be added. The content creator can optionally add variable content 1306 or choose to abort. A loop is entered in step 1308 whereby the newly added variable content is added to each of descendants of the variant 1310. The variable content may optionally not be added if the descendant has chosen to suppress all new variable content. Finally, the routine exits at step 1314.

Figure 14A:
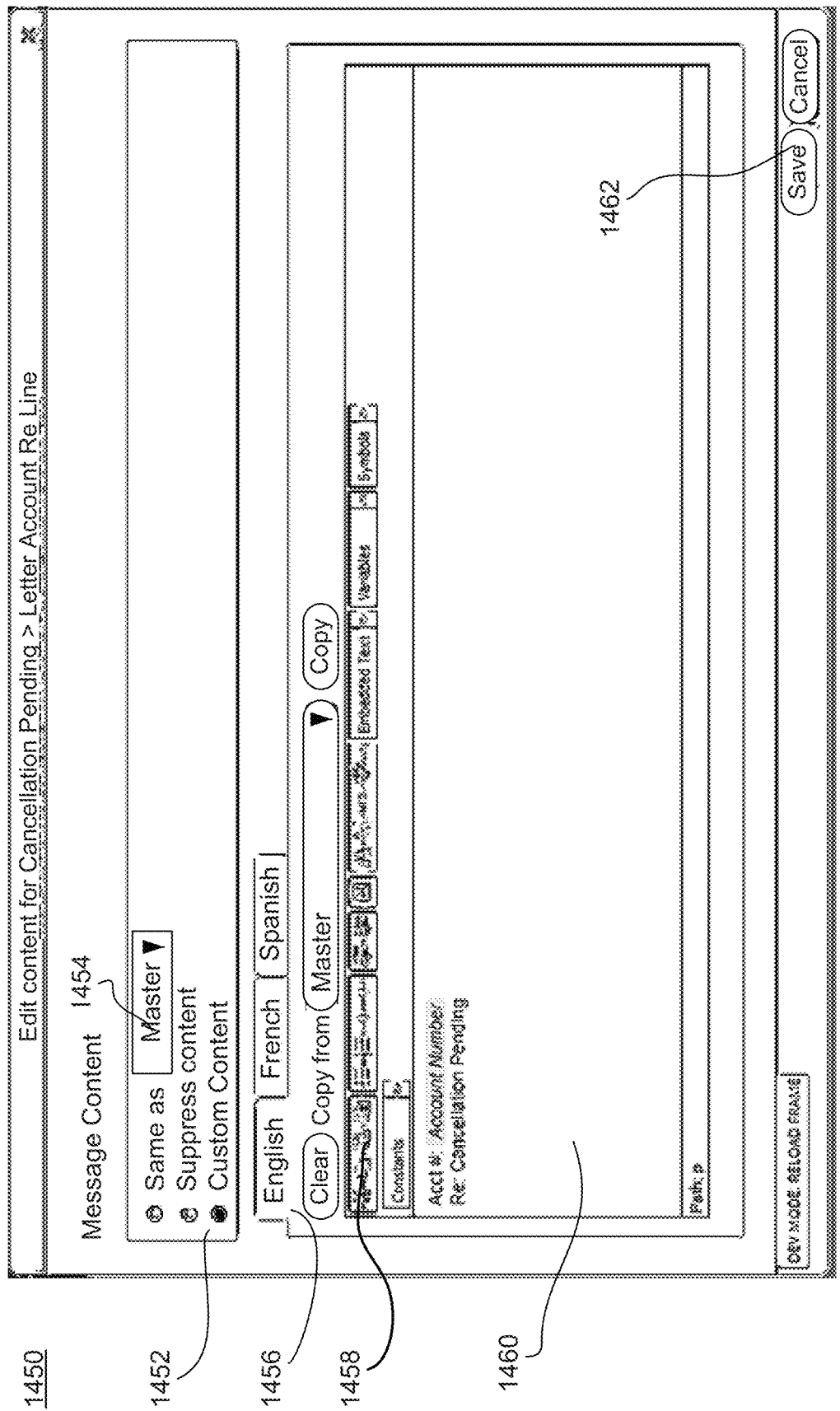
FIG. 14A is an example screen capture of a window for modifying a variation.

FIG. 14A shows a window 1450 of the user interface for modifying variable content. The content creator selects a UI element to modify variable content and the window 1450 is displayed. The variant can be set to be the same as the parent, to suppress content, or to customize content using the radio buttons 1452. If the variant is set to inherit the content of the parent, the dropdown 1454 allows the content creator to change from which parent the content inherits. For the present example, the content creator has selected customized content which displays a content edit box 1460 that has tabs 1456 allowing the content creator to have different languages. Also, a number of editing tools 1458 allows the content creator to author the content. Once the content creator is finished editing the customized content, save button 1462 is selected.

Figure 14B:
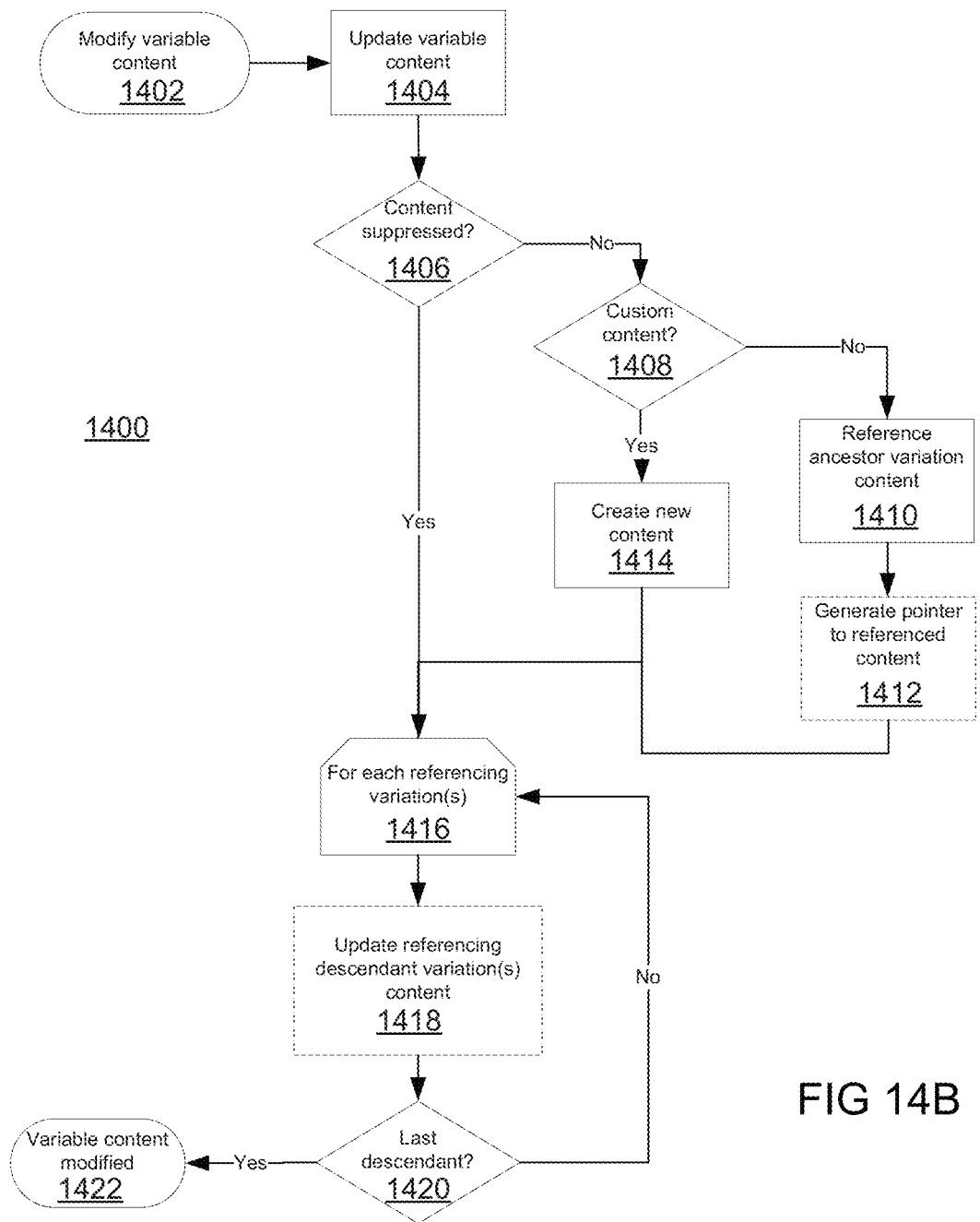
FIG. 14B is a flowchart for modifying variable content of the present invention.

In the flowchart 1400 of FIG. 14B enters the process at 1402 and displays window 1450 at step 1404 where the variable content is updated by the content creator. The routine then checks if the content creator has chosen to suppress the content 1406. If the content has not been suppressed, the routine checks to see if the content creator has chosen to customize the content 1408. If the content is not customized, the routine assumes that the content is to reference or inherit the variation content of an ancestor 1410 and optionally generates a pointer to the referenced content 1412. If the content is to be customized, the routine proceeds to 1414 where the content creator is able to modify the content. Each of the blocks 1406, 1412, and 1414 proceed to a loop 1416 that updates each of the descendant content variations in 1418 to match the modified variable content. The routine then checks if the last descendant has been reached 1420 and once all the descendents have been updated the routine exits at 1422.

Figure 15:
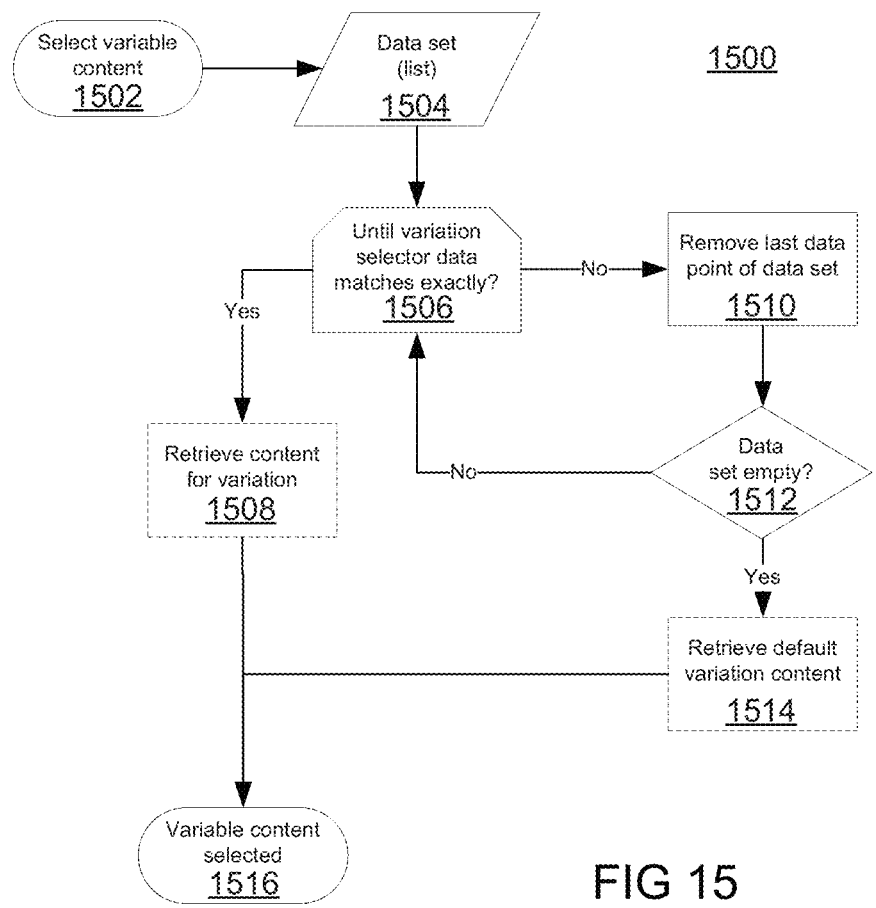
FIG. 15 is a flowchart for retrieving the variable content for a selected variant of the present invention.

FIG. 15 is a flowchart 1500 for retrieving the variable content for a selected variant either to preview or during touchpoint production. The process starts at 1502 that is activated manually by a content creator selecting a particular variant or automatically by a process generating the touchpoints. A data set such as a client data record is used as input 1504 to query a database of variant content. A loop begins by performing a query with the complete data set to see if the variation selector data matches 1506. If the data set matches the variation selector data, then the variation content is retrieved for that variant 1508. If there is no match, the least important data element of the data set is removed 1510 and the query is performed again. The last data element corresponds to the lowest select value as determined by the selector hierarchy. If the data set is empty 1512, then the default variation content is retrieved (if any) 1514. The process then exits at 1516. Generally, this algorithm will proceed through the variant hierarchy from the most specific variant to the least specific variant in an effort to find the 'best' match for the particular customer.

Although the terminology of 'inherited' is used throughout, one would realize that inherited content may also be described as shared content which can be centrally controlled and managed across all touchpoints.

Although the examples described herein show inheritance from a single parent, the inventor contemplates that multiple inheritances from a plurality of parents is possible.

Another embodiment of the present invention is applying the invention to a Messaging and Campaign Simulator that allows business users to manage virtual production runs to test and measure the performance of planned messages and campaigns. Furthermore, it allows business and operations a predictive process to assess cost drivers such as insert order quantities and page counts.

Another embodiment of the present invention is directed to its use as a method of using a computer system to provide at least one tool for personalized communications to a large customer population.

Although the content creator computer(s) 160, the databases 180, 151, 153 and the document composition server are shown as separate elements, it is possible that all these may reside on a single computing system or a collection of separate computing systems.

Yet another embodiment of the present invention is directed to its use as a method of using a computer system to provide tools to business and marketing users for managing, tracking and measuring dynamic customer-targeted messaging campaigns across both print and electronic channels.

Yet another embodiment of the present invention is directed to its use as a modular software system for enterprises for managing, tracking and measuring dynamic customer-targeted messaging campaigns across both print and electronic channels, with modules integrating core.

Another embodiment of the invention is directed to its use as delivering support to front line staff and customer service by providing messaging information on customers they speak to, by providing scripts to further reinforce the messages, by delivering the capability to capture customer responses, and by integrating with archive systems to view customer documents.

In one embodiment, the invention provides the first enterprise system for Customer Touchpoint Management (CTM) for marketing and product managers to manage, track and measure one to one communications with their customers. The invention may be implemented in industries such as, for example, financial services, banking, health care, retail, utilities, telecommunications, e-commerce transactions, Internet or online auctions, Internet or online purchases, Internet or online sales, Internet or online gaming, and insurance.

Although the embodiments of the invention described herein disclose message zones only receiving a single message of a single message type (graphical, textual, etc), one of skill in the art would know that the message zones could be configured to receive multiple messages or different data types.

Features of the embodiments described herein may include, for example: an agnostic enterprise CTM solution, compatible with multiple document composition technologies; scalable, high volume processing capability to deliver complex, customer messaging to a variety of message delivery formats and channels; message authoring by the business and marketing people; and full functionality in a distributed environment.

The system may be implemented on enterprise servers, web-based servers, and personal computers, laptop computers, hand held devices (e.g., PDAs) or any processing module with adequate processing functionality and memory capacity.

A person skilled in the art would appreciate that numerous modifications of the present invention are possible in light of the above description. While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention.

The above-described embodiments are intended to be examples of the present invention and alterations and modifications may be effected thereto, by those of skill in the art, without departing from the scope of the invention, which is defined solely by the claims appended hereto.

What is claimed is:

1. A processing system for composing a new touchpoint variant based on a first touchpoint variant and a second touchpoint variant created from the first touchpoint variant, the each of the first and second touchpoint variants comprising a plurality of message zones including a first message zone, each having a default message content selected from a hierarchical content database and targeting rules for identifying a group of recipients, the processing system comprising: a processor, memory and a non-transitory computer readable medium storing instructions that when executed by the processor perform the steps of:

creating the second touchpoint variant by:
creating a layout for the second touchpoint variant based on the first touchpoint variant, the second touchpoint variant having a corresponding plurality of new zones including a first new message zone;
displaying in a user interface, one or more of the plurality of new zones;
receiving editing input associated with a selected one of the plurality of zones;
in response to receiving said editing input selecting said selected new zone, updating a list obtained from said hierarchical content database to show only message content from higher up in said hierarchical content database having message content specific to the selected new zone,
updating the first new message zone with a new message comprising at least one new envelope and at least one new message content wherein each of the at least one the new envelope comprising a priority attribute, the at least one new message content selected from said hierarchical content database based on the priority attribute such that determining which message contents among a plurality of applicable message contents takes precedence in the event that not all of the applicable messages will fit in the first new message zone, comprises selecting message contents having the highest priority that fit within the new message zone;
in response to receiving input selecting a message content from the list, rendering the message content in said selected new zone for the selected zone,
in response to receiving another input, creating at least one new additional second message zone for the second touchpoint variant and for each descendant of the second touchpoint variant, said additional second message zone not having a corresponding message zone in said existing touchpoint variant, and creating the new touchpoint variant
creating a layout for the new touchpoint variant based on the second touchpoint variant, the new touchpoint variant having a corresponding plurality of new zones including a first new message zone;
displaying in a user interface, one or more of the plurality of new zones;
receiving editing input associated with a selected one of the plurality of zones;
in response to receiving said editing input selecting said selected new zone, updating a list obtained from said hierarchical content database to show only message content from higher up in said hierarchical content database having message content specific to the selected new zone,
updating the first new message zone with a new message comprising at least one new envelope and at least one new message content wherein each of the at least one the new envelope comprising a priority attribute, the at least one new message content selected from said hierarchical content database based on the priority attribute such that determining which message contents among a plurality of applicable message contents takes precedence in the event that not all of the applicable messages will fit in the first new message zone, comprises selecting message contents having the highest priority that fit within the new message zone;
in response to receiving input selecting a message content from the list, rendering the message content in said selected new zone for the selected zone,
in response to receiving another input, creating at least one new additional second message zone for the new touchpoint variant and for each descendant of the new touchpoint variant, said additional second message zone not having a corresponding message zone in said existing touchpoint variant, and outputting the touchpoint to at least one device of the group of recipients identified by the targeting rules.

2. The system according to claim 1, wherein the non-transitory computer readable medium further comprises a set of selection data, and the instructions further include querying the database by a variation selector, wherein the variation selector iteratively removes data elements from the selection data until the selection data matches a variation selector data in order to select the variant.

3. The system according to claim 2, wherein the touchpoint variant has a default template message for each of the plurality of the zones and wherein if the variation selector has removed all of the data elements from the selection data, choosing the default template message and rendering the new touchpoint variant by placing the corresponding default template message into the plurality of new zones of the new touchpoint.

4. The system according to claim 1, wherein at least a portion of the variants in the hierarchical database lower in the hierarchy are inherited from the messages of variants higher in the hierarchy.

5. The system according to claim 1, wherein at least a portion of the variants lower in the hierarchy are customized from the messages of variants higher in the hierarchy.

6. The system according to claim 1, wherein the envelope of at least a portion of the messages of variants lower in the hierarchy suppress the messages of variants higher in the hierarchy.

7. The system according to claim 1, wherein the envelope is fixed and the message content is modifiable.

8. The system according to claim 7, wherein the envelope contains at least one of targeting criteria, timing criteria, and priority criteria.

9. The system according to claim 7, wherein the message content comprises: at least one of graphical, audio, video, or textual data.

10. The system according to claim 1, wherein the at least one device comprises at least one of a display, a laptop, a personal computer, a mobile phone, an AFP print streams for printing via high volume printers, and PDF output for archiving or electronic delivery.

11. A machine implemented method for composing a new touchpoint variant based on at least one existing touchpoint variant, the at least one existing touchpoint variant comprising a plurality of message zones each having a default message content selected from a hierarchical content database and targeting rules for identifying a group of recipients, the method comprising:
creating the second touchpoint variant from the first touchpoint variant by:
creating a layout for the second touchpoint variant based on the first touchpoint variant, the second touchpoint variant having a corresponding plurality of new zones including a first new message zone;
displaying in a user interface, one or more of the plurality of new zones;
receiving editing input associated with a selected one of the plurality of zones;
in response to receiving said editing input selecting said selected new zone, updating a list obtained from said hierarchical content database to show only message content from higher up in said hierarchical content database having message content specific to the selected new zone,
updating the first new message zone with a new message comprising at least one new envelope and at least one new message content wherein each of the at least one the new envelope comprising a priority attribute, the at least one new message content selected from said hierarchical content database based on the priority attribute such that determining which message contents among a plurality of applicable message contents takes precedence in the event that not all of the applicable messages will fit in the first new message zone, comprises selecting message contents having the highest priority that fit within the new message zone;
in response to receiving input selecting a message content from the list, rendering the message content in said selected new zone for the selected zone,
in response to receiving another input, creating at least one new additional second message zone for the second touchpoint variant and for each descendant of the second touchpoint variant, said additional second message zone not having a corresponding message zone in said existing touchpoint variant, and
creating the new touchpoint variant from the second touchpoint by:
creating a layout for the new touchpoint variant based on the second touchpoint variant, the new touchpoint variant having a corresponding plurality of new zones;
displaying in a user interface, one or more of the plurality of new zones;
receiving editing input associated with a selected one of the plurality of zones;
in response to receiving said editing input selecting said selected new zone, updating a list obtained from said hierarchical content database to show only message content from higher up in said hierarchical content database having message content specific to the selected new zone;
updating the first new message zone with a new message comprising at least one new envelope and at least one new message content wherein each of the at least one the new envelope comprises a priority attribute, the at least one new message content selected from said hierarchical content database based on the priority attribute such that determining which message contents among a plurality of applicable message contents takes precedence in the event that not all of the applicable messages will fit in the first new message zone, comprises selecting message contents having the highest priority that fit within the new message zone; and
in response to receiving input selecting a message content from the list, rendering the message content in said selected new zone for the selected zone,
in response to receiving another input, creating at least one new additional second message zone for the new touchpoint variant and for each descendant of the new touchpoint variant, said additional second message zone not having a corresponding message zone in said at least one existing touchpoint variant, and
outputting the touchpoint to at least one device of the group of recipients identified by the targeting rules.

12. The method according to claim 11, wherein the non-transitory computer readable medium further comprises a set of selection data, and the method further comprising querying the database by a variation selector and iteratively removing data elements from the selection data until the selection data matches a variant from the database in order to select the variant.

13. The method according to claim 12, further comprising the step of: when removing all of the data elements from the selection data, choosing the template as the at least one existing touchpoint variant, wherein the template has at least one default message as the selected variant.

14. The method according to claim 11 further comprising the step of: inheriting at least a portion of the message contents of variants lower in the hierarchy from the message contents of variants higher in the hierarchy.

15. The method according to claim 11 further comprising the step of: customizing at least a portion of the message contents of variants lower in the hierarchy from the message contents of variants higher in the hierarchy.

16. The method according to claim 11 further comprising the step of: suppressing at least a portion of the message contents of variants lower in the hierarchy from the message contents of variants higher in the hierarchy.

17. The method according to claim 11, wherein the envelope is fixed and a message content is modifiable.

18. The method according to claim 17, wherein the envelope contains at least one of: targeting attribute, timing criteria, and said priority attribute.

19. The method according to claim 17, wherein the message content comprises at least one of: graphical, audio, video, or textual data.

20. The method according to claim 11, wherein the at least one device is selected from at least one of a display, a laptop, a personal computer, a mobile phone, an AFP print streams for printing via high volume printers, and PDF output for archiving or electronic delivery.

21. A non-transitory computer readable medium having instructions thereon, which when executed by a computer system comprising a processor and memory, cause the processor to composing a new touchpoint variant based on an at least one existing touchpoint variant, the at least one existing touchpoint variant comprising a plurality of message zones each having a default message content selected from a hierarchical content database and targeting rules for identifying a group of recipients, by performing the steps of:
creating the second touchpoint variant from the first touchpoint variant by:
creating a layout for the second touchpoint variant based on the first touchpoint variant, the second touchpoint variant having a corresponding plurality of new zones including a first new message zone;
displaying in a user interface, one or more of the plurality of new zones;
receiving editing input associated with a selected one of the plurality of zones;
in response to receiving said editing input selecting said selected new zone, updating a list obtained from said hierarchical content database to show only message content from higher up in said hierarchical content database having message content specific to the selected new zone,
updating the first new message zone with a new message comprising at least one new envelope and at least one new message content wherein each of the at least one the new envelope comprising a priority attribute, the at least one new message content selected from said hierarchical content database based on the priority attribute such that determining which message contents among a plurality of applicable message contents takes precedence in the event that not all of the applicable messages will fit in the first new message zone, comprises selecting message contents having the highest priority that fit within the new message zone;
in response to receiving input selecting a message content from the list, rendering the message content in said selected new zone for the selected zone,
in response to receiving another input, creating at least one new additional second message zone for the second touchpoint variant and for each descendant of the second touchpoint variant, said additional second message zone not having a corresponding message zone in said existing touchpoint variant, and
creating the new touchpoint variant from the second touchpoint by:
creating a layout for the new touchpoint variant based on the second touchpoint variant, the new touchpoint variant having a corresponding plurality of new zones;
displaying in a user interface, one or more of the plurality of new zones;
receiving editing input associated with a selected one of the plurality of zones;
in response to receiving said editing input selecting said selected new zone, updating a list obtained from said hierarchical content database to show only message content from higher up in said hierarchical content database having message content specific to the selected new zone,
updating the first new message zone with a new message comprising at least one new envelope and at least one new message content wherein each of the at least one the new envelope comprises a priority attribute, the at least one new message content selected from said hierarchical content database based on the priority attribute such that determining which message contents among a plurality of applicable message contents takes precedence in the event that not all of the applicable messages will fit in the first new message zone, comprises selecting message contents having the highest priority that fit within the new message zone;
and in response to receiving input selecting a message content from the list, rendering the message content in said selected new zone for the selected zone,
in response to receiving another input, creating at least one new additional second message zone for the new touchpoint variant and for each descendant of the new touchpoint, said additional second message zone not having a corresponding message zone in said at least one existing touchpoint variant, and
outputting the touchpoint to at least one device of the group of recipients identified by the targeting rules.

22. The computer readable medium according to claim 21, wherein the envelope is fixed and the message content is modifiable.

23. The computer readable medium according to claim 22, wherein the envelope contains at least one of: targeting attribute, timing criteria, and said priority attribute.

* * * * *